(12) United States Patent
Goto et al.

(10) Patent No.: US 7,688,018 B2
(45) Date of Patent: Mar. 30, 2010

(54) INVERTER

(75) Inventors: Naomi Goto, Shiga (JP); Yasufumi Kurahashi, Shiga (JP)

(73) Assignee: Panasonic Corporation, Osaka (JP)

( * ) Notice: Subject to any disclaimer, the term of this patent is extended or adjusted under 35 U.S.C. 154(b) by 17 days.

(21) Appl. No.: 12/097,420

(22) PCT Filed: Dec. 12, 2006

(86) PCT No.: PCT/JP2006/324714

§ 371 (c)(1), (2), (4) Date: Jun. 13, 2008

(87) PCT Pub. No.: WO2007/069580

PCT Pub. Date: Jun. 21, 2007

(65) Prior Publication Data

US 2009/0167223 A1    Jul. 2, 2009

(30) Foreign Application Priority Data

Dec. 16, 2005  (JP) ............... 2005-363011
Oct. 18, 2006  (JP) ............... 2006-283361

(51) Int. Cl.
*G05B 11/28* (2006.01)
(52) U.S. Cl. .............. 318/599; 318/432; 318/811
(58) Field of Classification Search .......... 318/727, 318/432, 798, 800, 599, 811
See application file for complete search history.

(56) References Cited

U.S. PATENT DOCUMENTS

| | | | |
|---|---|---|---|
| 4,458,194 A * | 7/1984 | Geppert et al. | 318/811 |
| 4,772,996 A * | 9/1988 | Hanei et al. | 363/41 |
| 5,350,988 A * | 9/1994 | Le | 318/618 |
| 6,301,137 B1 * | 10/2001 | Li | 363/98 |
| 6,683,799 B2 * | 1/2004 | Kato et al. | 363/37 |
| 7,015,664 B2 * | 3/2006 | Coles et al. | 318/400.01 |

FOREIGN PATENT DOCUMENTS

| | | |
|---|---|---|
| JP | 2001-178182 A | 6/2001 |
| JP | 2003-189670 A | 7/2003 |
| JP | 2003-209976 A | 7/2003 |
| JP | 2004-104977 A | 4/2004 |
| JP | 2004-282884 A | 10/2004 |
| JP | 2005-176565 A | 6/2005 |

OTHER PUBLICATIONS

International Search Report for PCT/JP2006/324714, dated Feb. 20, 2007.

* cited by examiner

*Primary Examiner*—Rina I Duda
(74) *Attorney, Agent, or Firm*—RatnerPrestia

(57) ABSTRACT

An inverter contains the following structure: an inverter circuit having upper-arm switching elements connected on the positive side of a DC power source and lower-arm switching elements connected on the negative side of the DC power source; a current sensor that detects current flowing between the DC power source and the inverter circuit; and a control circuit that not only effects control of the inverter circuit so that AC is fed to a motor from the inverter circuit according to an ON-period controlled by a PWM system, but also makes a correction to the ON-period so as to allow the current sensor to detect phase current. The control circuit determines an amount of the correction by judging a direction of current of a phase having an intermediate length of the ON-period.

9 Claims, 21 Drawing Sheets

U-phase current    U-phase upper-arm ON

W-phase current    U-phase upper-arm ON
                           V-phase upper-arm ON U-phase current    U-phase upper-arm ON W-phase current  U-phase upper-arm ON
V-phase upper-arm ON FIG. 39A
PRIOR ART
FIG. 39B
PRIOR ART
FIG. 39C
PRIOR ART
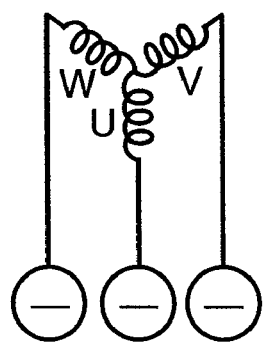
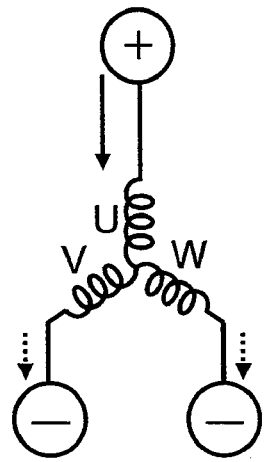
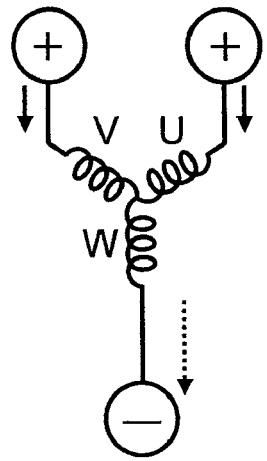
FIG. 40A
PRIOR ART
FIG. 40B
PRIOR ART
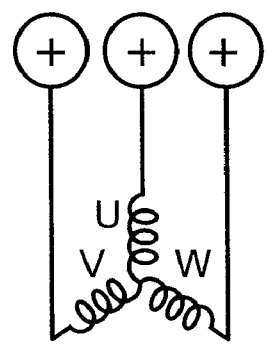
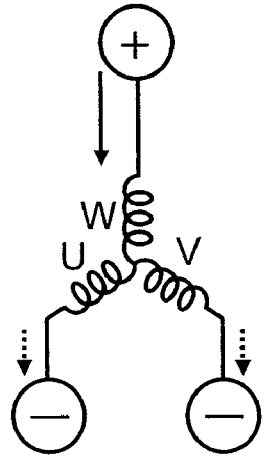

though the average of phase current in each carrier cycle changes, there is no influence on ripple in a longer span than a carrier cycle, which invites no increase in loss.

INVERTER

This application is a U.S. National Phase Application of PCT International Application PCT/JP2006/324714.

TECHNICAL FIELD

The present invention relates to phase-current detection of an inverter that operates on a pulse-width modulation (PWM) system.

BACKGROUND ART

As for phase-current detection in the case above, a method in which phase-current is detected from the current of a DC power line is conventionally well known (see patent reference 1*).

The conventional structure will be described hereinafter with reference to a circuit diagram shown in FIG. 34. According to an rpm instruction signal (not shown) and the like, control circuit 112 of inverter 123 effects control of switching elements 102 in a manner so as to convert DC fed from battery 101 into AC. The AC is fed to stator winding 104 of motor 111, by which magnet rotor 105 is driven. Diodes 103 form a circulating route of current flowing to stator winding 104. In the explanations given hereinafter, it will be assumed that switching elements 102 are formed of upper-arm switching elements U, V, W and lower-arm switching elements X, Y, Z.

Current sensor 106 detects the current value and sends it to control circuit 112. Control circuit 112 uses the value for calculation of power consumption, judgment for protecting switching elements 102 and positional detection of magnet rotor 105.

FIG. 35 shows waveforms (i.e., U-phase terminal voltage 141, V-phase terminal voltage 142, W-phase terminal voltage 143 and neutral-point voltage 129) in sinusoidal three-phase modulation with a maximum modulation degree of 10%. FIG. 36A shows the ON-period (ON-duty) of upper-arm switching elements U, V, W in one carrier (a carrier cycle) at a phase of around 105° in FIG. 35. The ON-period of upper-arm switching elements U, V and W is evenly shown on the left and right sides from the middle of a carrier cycle. In the figure, a thin solid line represents the ON period of the U-phase; a medium solid line represents the V-phase; and a thick solid line represents the W-phase. According to the length of the ON-period, the phases are herein referred to the maximum ON-period phase (the U-phase, in this case), the intermediate ON-period phase (i.e., the V-phase) and the minimum ON-period phase (i.e., the W-phase).

The ON/OFF state of upper-arm switching elements U, V, W tells that which phase of current is detected by current sensor 106. That is, when only one phase is turned on, the current corresponding to the phase flows; when two phases are turned on, the current corresponding to the remaining phase flows; and when all the three phases are turned on or off, no current flows. The ON/OFF state of upper-arm switching elements U, V, W tells which phase-current is detectable by current sensor 106.

In FIG. 36A, α represents the period with only one phase turned on and β represents the period with two phases turned on, both of which are too short for current sensor 106 to detect the phase current. FIG. 36B shows an example that addresses the inconveniency. First, time δ is determined so that current sensor 106 detects the phase current. Time δ is a uniform value with a margin of time in consideration of various situations. In the left half (i.e., in the beginning) of the carrier cycle of FIG. 36B, the ON-period of the U-phase is increased so that α equals to δ; on the other hand, the ON-period of the W-phase is decreased so that β equals to δ. The correction above allows current sensor 106 to detect current of the U-phase and the W-phase. In FIG. 36B, arrows U and W indicate the phase-current-detectable periods of the U-phase and the W-phase.

Compared to the state with no correction, the phase current has a change in the state having correction. Here will be detailed the change in phase current. For sake of clarity, suppose that stator winding 104 of the motor carries inductance L only and resistance R of zero. Besides, for the purpose of obtaining change in the phase current in a carrier cycle, the description will be given without consideration of induced voltage that has little change in a carrier cycle. In addition, the description will be given on the assumption that there is no change in current on the PWM system in two or three consecutive carrier cycles.

FIG. 37 shows the behavior of the phase current (U-phase current iU, V-phase current iV and W-phase current iW) with no correction in two consecutive carrier cycles. In the two carrier cycles, there is no change in current on the PWM system and the ON-period of each phase has a same pattern in the two cycles. In the period where all the three phases have no ON-period (i.e., in the state shown in FIG. 39A), each phase current has no change. In the period where the U-phase only has the ON-period (see FIG. 39B, where an arrowed solid line shows an increase; an arrowed broken line shows a decrease), U-phase current iU increases, whereas V-phase current and W-phase current decrease; current iU changes twice as much as current iV and iW. In the period, each phase current exhibits a linear change, as is shown by the equation: E=Ldi/dt (where, L represents inductance of the stator winding; E represents DC voltage; i represents current), and di/dt, which represents the rate of change with time of current i, takes constant E/L. In the period where the U-phase and the V-phase have the ON-period (see FIG. 39C), W-phase current iW decreases, whereas U-phase current iU and V-phase current iV increase; current iW changes twice as much as current iU and iV. In the period where all the three phases have the ON-period (see FIG. 40A), each phase current has no change.

FIG. 38 shows carrier cycles with correction provided. The carrier cycle on the left side has the correction shown in FIG. 36B. On the other hand, the carrier cycle on the right side has the correction from the state of FIG. 36B to the state of FIG. 36A. That is, to cancel out the correction of FIG. 36B, the correction is provided in a manner that the ON-period of the U-phase decreases, whereas the ON-period of the W-phase increases. In the period where only the W-phase has the ON-period (see FIG. 40B), W-phase current iW increases, whereas U-phase current iU and V-phase current iV decrease; current iW changes twice as much as current iU and iV.

In the carrier cycle without correction (see FIG. 37), each phase current has a gradual, smooth change. On the other hand, in the carrier cycle with correction (see FIG. 38), increasing U-phase current iU has a noticeable rise in the left carrier cycle and has a decrease in the right; in contrast, decreasing W-phase current iW has a noticeable fall in the left carrier cycle and has a rise in the right. Such unwanted variations in phase current are regarded as a ripple current. The ripple current increases with the amount of correction. The ripple current similarly occurs in other correction methods. In the end of the carrier cycle on the right side, U-phase current iU, V-phase current iV and W-phase current iW have a value the same as each phase current in a carrier cycle without correction. That is, increase/decrease in the phase current throughout two carrier cycles with correction has no difference from that in a carrier cycle without correction, and accordingly, there is no influence on the PWM system. In other words, there is no change in phase voltage and phase current throughout two carrier cycles.

To suppress the ripple current and unwanted effect caused by the ripple, some suggestions have been made. For example, according to the methods disclosed in patent references 2* and 3*, there is no need for correction on the ON-period for phase-current detection, and therefore no noise and vibration caused by the ripple current. As compared to the methods above, employing a single current-sensor decreases parts count; and accordingly, contributes to a compact and lightweight structure with high reliability in vibration-proof or the like. The structure detects maximum current passing through the upper-arm and lower-arm switching elements, protecting the switching elements and the diodes connected in parallel from damage. Besides, the current detected by current sensor 106 is DC fed from battery 101, by which electric power fed from battery 101 can be easily calculated.

In phase-current detection, compared to the structure with two or three current-sensors, the structure with a single current-sensor has the advantage of being compact by virtue of its low parts count and improved reliability in vibration-proof or the like.

However, in a case with a small degree of modulation, the phase current cannot be detected without correction. Correction causes a ripple current. The ripple current has an ill effect, as an electromagnetic force, on the stator winding of the motor, mechanical components and the housing, inviting undesirable noise and vibration. In particular, in a vehicle-mounted electric compressor, manufacturers have a difficulty in disposing a noise-proof box in an effort of reducing the size and weight of the compressor. Decrease in vibration and noise has been a major challenge.

Greater amount of correction causes greater ripple current, increasing vibration and noise. To minimize correction, the amount of correction should be determined on a case-by-case basis, not on a constant basis.

Patent reference 1*: Japanese Unexamined Patent Application Publication No. 2003-189670

Patent reference 2*: Japanese Unexamined Patent Application Publication No. 2004-282884

Patent reference 3*: Japanese Unexamined Patent Application Publication No. 2003-209976

SUMMARY OF THE INVENTION

The inverter of the present invention has the following structure: an inverter circuit having upper-arm switching elements connected on the positive side of a DC power source and lower-arm switching elements connected on the negative side of the DC power source; a current sensor for detecting current flowing between the DC power source and the inverter circuit; and a control circuit energizing the inverter circuit by a PWM system for the inverter circuit to supply an AC to a motor, and detecting a phase current with the current sensor through a correction of a time, during which an ON-signal is supplied to one or two of the upper-arm switching elements, into a predetermined time necessary for detecting the phase current by the current sensor within a carrier cycle. The control circuit judges a direction of current, i.e. direction flowing into the motor or direction flowing out of the motor, of a phase having an intermediate length of an ON-period in the carrier cycle and changes the predetermined time according to the direction.

The structure above allows the inverter to properly determine the amount of correction according to the direction of the phase current (i.e., current flowing between the inverter circuit and the motor), thereby suppressing the amount of correction as a whole. That is, the amount of correction required for phase-current detection depends on the direction of the phase current of a phase having the intermediate length of the ON-period in the three phases. Properly controlled amount of correction according to the direction suppresses correction as a whole, and accordingly, suppresses ripple current. This contributes to decreased vibration and noise.

BRIEF DESCRIPTION OF THE DRAWINGS

FIG. 39A shows a first state of phase current when all the three phases have no ON-period.

FIG. 39B shows the first state of phase current when the U-phase only has the ON-period.

FIG. 39C shows the first state of phase current when the U-phase and the V-phase have the ON-period.

FIG. 40A shows a second state of phase current when all the three phases have the ON-period.

FIG. 40B shows the second state of phase current when the W-phase only has the ON-period.

REFERENCE MARKS IN THE DRAWINGS

Figure 1:
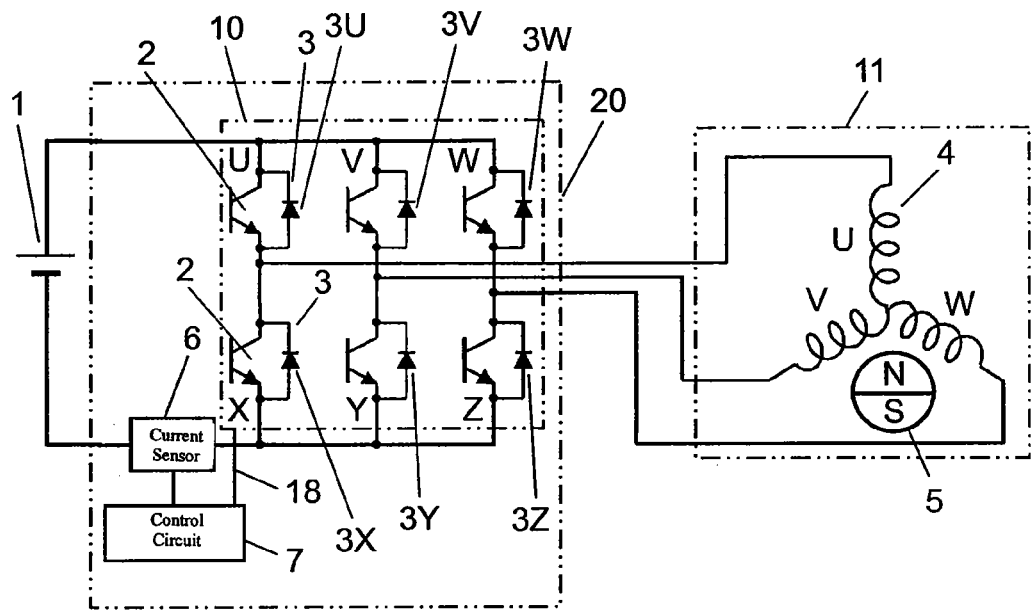
FIG. 1 is an electric circuit diagram showing an inverter and the peripheral structure in accordance with a first exemplary embodiment of the present invention.

1 DC power source (battery)
2 switching element
3 diode
4 stator winding
5 magnet rotor
6 current sensor
7 control circuit
10 inverter circuit
11 motor (sensorless DC brush less motor)
20 inverter
40 electric compressor

DETAILED DESCRIPTION OF THE PREFERRED EMBODIMENTS

The exemplary embodiments of the present invention are described hereinafter with reference to the accompanying drawings. It is to be understood that the present invention is not limited to the embodiments.

First Exemplary Embodiment

FIG. 1 is an electric circuit diagram showing inverter 20 and the peripheral structure in accordance with the first exemplary embodiment of the present invention. Receiving voltage from current sensor 6 disposed on a power source line, control circuit 7 of inverter 20 detects phase current. Control circuit 7 detects current in two phases and calculates the current value of the remaining one phase from the detected two current values. In the calculation, Kirchhoff's law is applied to a neutral point of stator winding 4.

Using the three current values, control circuit 7 detects the position of magnet rotor 5 that constitutes sensorless DC brushless motor 11 (hereinafter, motor 11) by calculating induced voltage of stator winding 4. According to an rpm instruction signal (not shown) and the like, control circuit 7 effects control of switching elements 2 of inverter circuit 10 so that DC voltage from DC power source 1 (hereinafter, battery 1) is switched by PWM driving. Through the modulation, sinusoidal wave-shaped AC is fed to stator winding 4 of motor 11.

Diodes 3 of inverter circuit 10 form a circulating route of current flowing to stator winding 4. For convenience's sake, explanations will be given hereinafter on the understanding as follows: switching elements 2 are formed of upper-arm switching elements U, V, W and lower-arm switching elements X, Y, Z; and switching elements U, V, W, X, Y and Z have diodes 3U, 3V, 3W, 3X, 3Y and 3Z, respectively.

Current sensor 6 should be a structure capable of detecting instantaneous peak current, such as a current sensor employing a Hall element, a shunt resistor. Current sensor 6 can be disposed on the positive side of the power source line. Employing a shunt resistor is advantageous to form the inverter to have a compact and vibration-proof structure. Connecting line 18 connects control circuit 7 to upper-arm switching elements U, V, W and lower-arm switching elements X, Y, Z via a drive circuit so that control circuit 7 effects control of the switching elements. When switching elements 2 are formed of an IGBT or a power MOSFET, control circuit 7 controls gate voltage; when they are formed of a power transistor, control circuit 7 controls base current.

Figure 2:
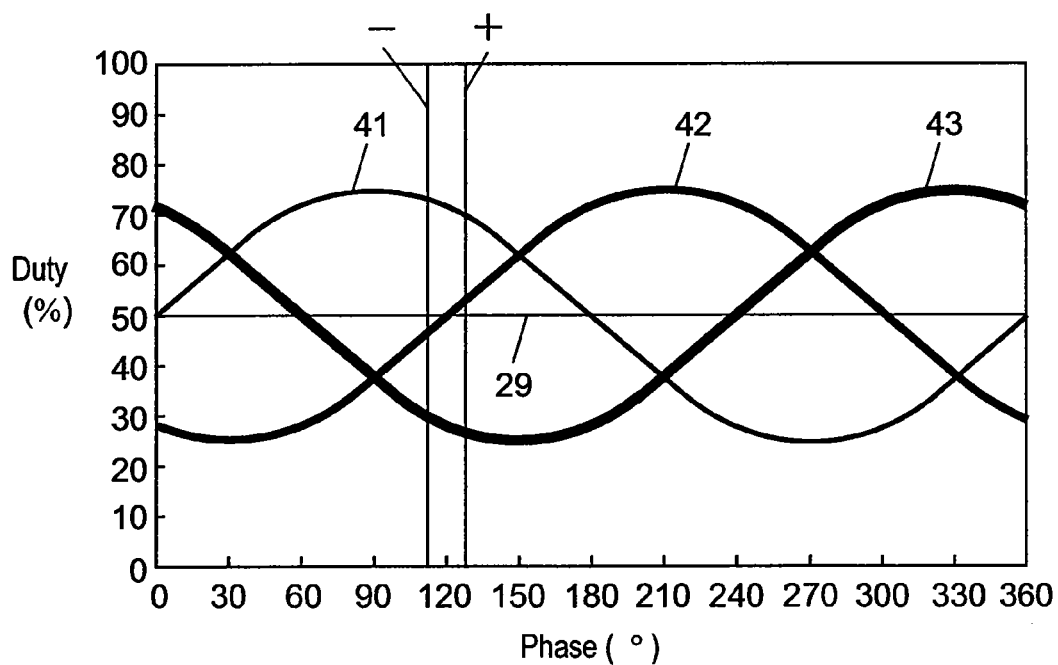
FIG. 2 shows modulated waves in each phase in three-phase modulation with a maximum modulation degree of 50% in the inverter.

Next will be described phase-current detection by current sensor 6. FIG. 2 shows waveforms of each phase (i.e., U-phase terminal voltage 41, V-phase terminal voltage 42, W-phase terminal voltage 43 and neutral-point voltage 29) in three-phase modulation with a maximum modulation degree of 50%. In the three-phase modulation, the amplitude of a waveform increases in the directions of 0% and 100% as the degree of modulation increases. In general, the correction for phase-current detection is provided for the modulation with a low maximum-modulation degree of around 10%. In the description here, for the sake of clarity in the drawing, FIG. 2 shows the modulation with a maximum modulation degree of 50%.

The phase of each terminal voltage (i.e., applied voltage) is assumed to be nearly equal to the phase of each phase-current. At the phase having negative (−) sign in FIG. 2, the current passing the V-phase (as the intermediate ON-period phase) is fed from motor 11. The direction of current fed from motor 11 is defined as the negative (−) direction. At the phase having positive (+) sign in FIG. 2, the current passing the V-phase (as the intermediate ON-period phase) is fed into motor 11. The direction of current flowing into motor 11 is defined as the positive (+) direction. On the other hand, the U-phase (as the maximum ON-period phase) carries current in the positive (+) direction at both the phases having negative (−) and positive (+) signs. The W-phase (as the minimum ON-period phase) carries current in the negative (−) direction at the both phases above.

Figure 3:
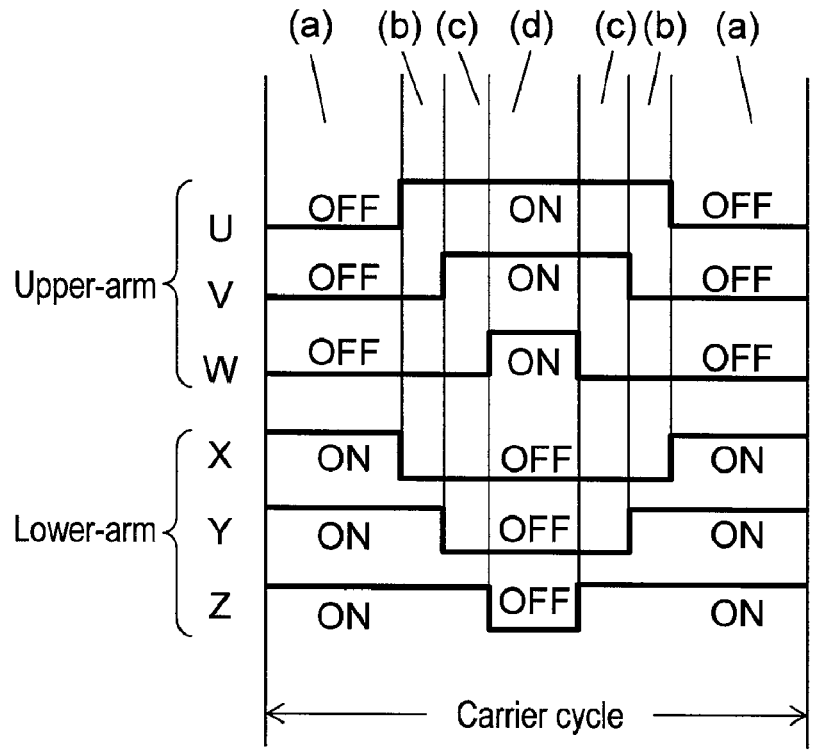
FIG. 3 is a timing chart of the ON-period of each phase in a carrier cycle.

FIG. 3 shows an ON/OFF state of upper-arm switching elements U, V, W and the lower-arm switching elements X, Y, Z in one carrier (a carrier cycle). The switching operation, which is controlled by ON/OFF-signals fed from control circuit 7, is practically attained by a timer function of a microprocessor. FIG. 3 shows a timing chart at around a phase represented by the positive (+) and negative (−) signs (i.e., a phase of around 120°) in FIG. 2. As is shown in FIG. 3, there are four switching patterns (a), (b), (c) and (d).

First will be described the state on the phase with the negative (−) sign in FIG. 2. The V-phase (as the intermediate ON-period phase) carries current, as described above, in the negative (−) direction.

Figure 4:
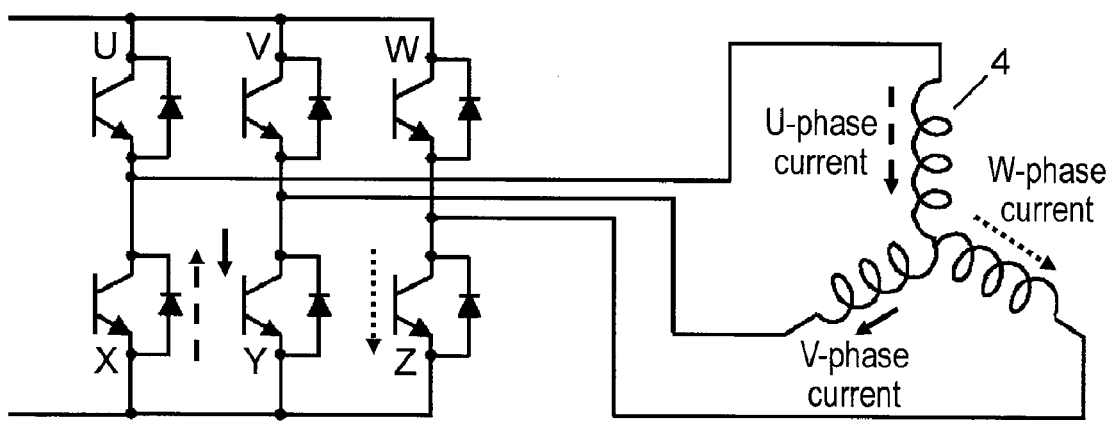
FIG. 4 is an electric circuit diagram showing the current path of pattern (a) in a case where the phase having the intermediate length of the ON-period carries negative (−) current.

In the period of pattern (a), all of upper-arm switching elements U, V, W are turned off, whereas all of lower-arm switching elements X, Y, Z are turned on. FIG. 4 shows the current flow in this state. U-phase current iU flows from the diode disposed parallel to lower-arm switching element X to stator winding 4. V-phase current iV and W-phase current iW flow from stator winding 4 to lower-arm switching element Y and Z, respectively. Therefore, current sensor 6 carries no current to detect.

Figure 5:
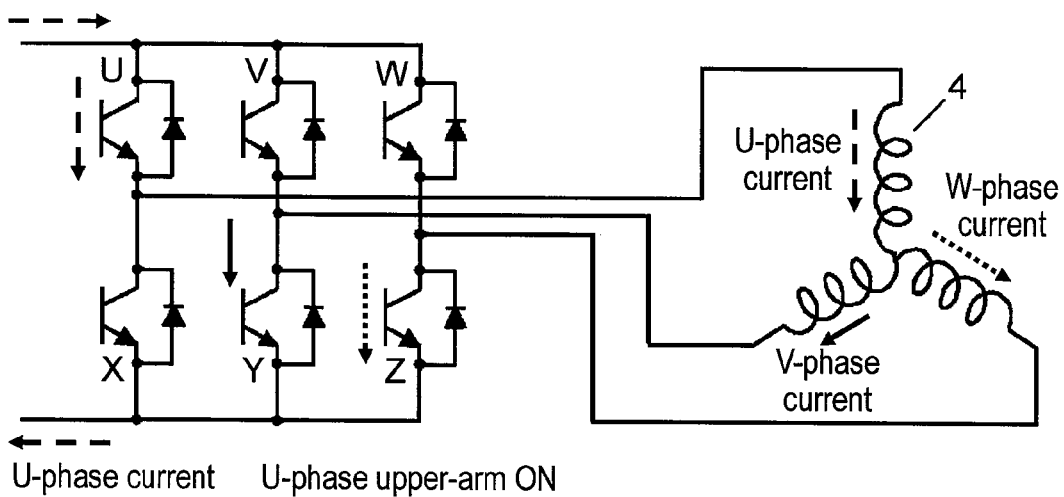
FIG. 5 is an electric circuit diagram showing the current path of pattern (b) in the case above.

In the period of pattern (b), upper-arm switching element U and lower-arm switching elements Y, Z are turned on. FIG. 5 shows the current flow in this state. In this period, U-phase current iU flows from upper-arm switching element U to stator winding 4. V-phase current iV and W-phase current iW flow from stator winding 4 to lower-arm switching elements Y and Z, respectively. That is, current sensor 6 detects U-phase current iU.

Figure 6:
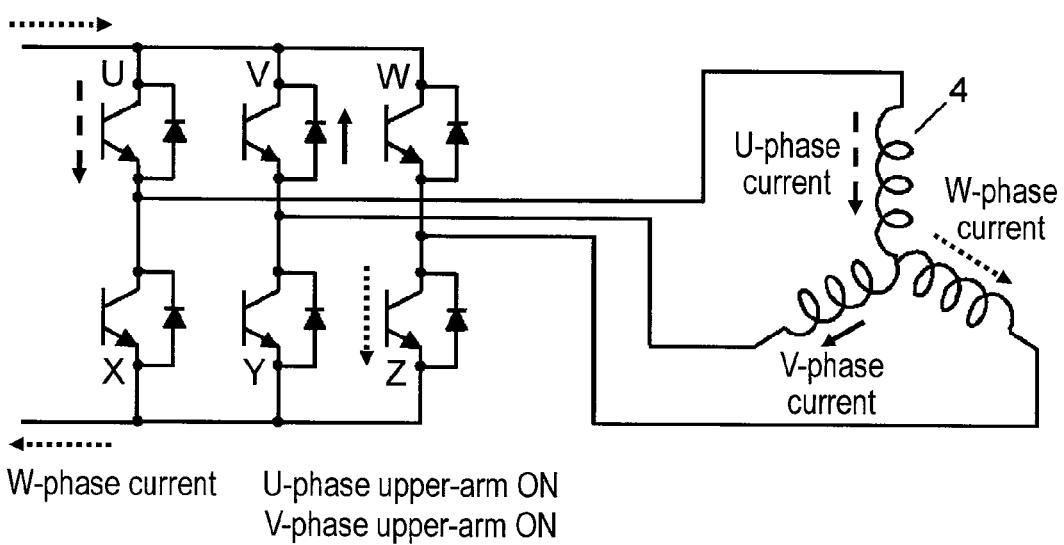
FIG. 6 is an electric circuit diagram showing the current path of pattern (c) in the case above.

In the period of pattern (c), upper-arm switching elements U, V and lower-arm switching element Z are turned on. FIG. 6 shows the current flow in this state. In this period, U-phase current iU flows from upper-arm switching elements U to stator winding 4. V-phase current iV flows from stator winding 4 to the diode disposed parallel to upper-arm switching element V. W-phase current iW flows from stator winding 4 to lower-arm switching element Z. That is, current sensor 6 detects W-phase current iW.

Figure 7:
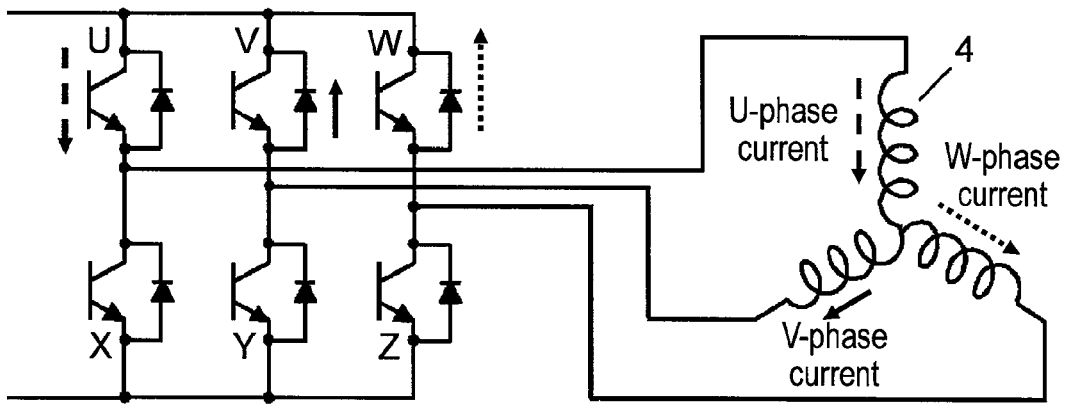
FIG. 7 is an electric circuit diagram showing the current path of pattern (d) in the case above.

In the period of pattern (d), all of upper-arm switching elements U, V, W are turned on, whereas all of lower-arm switching elements X, Y, Z are turned off. FIG. 7 shows the current flow in this state. U-phase current iU flows from upper-arm switching elements U to stator winding 4. V-phase current iV and W-phase current iW flow from stator winding 4 to the diodes disposed parallel to upper-arm switching elements V and W, respectively. That is, current sensor 6 carries no current to detect.

Figure 8:
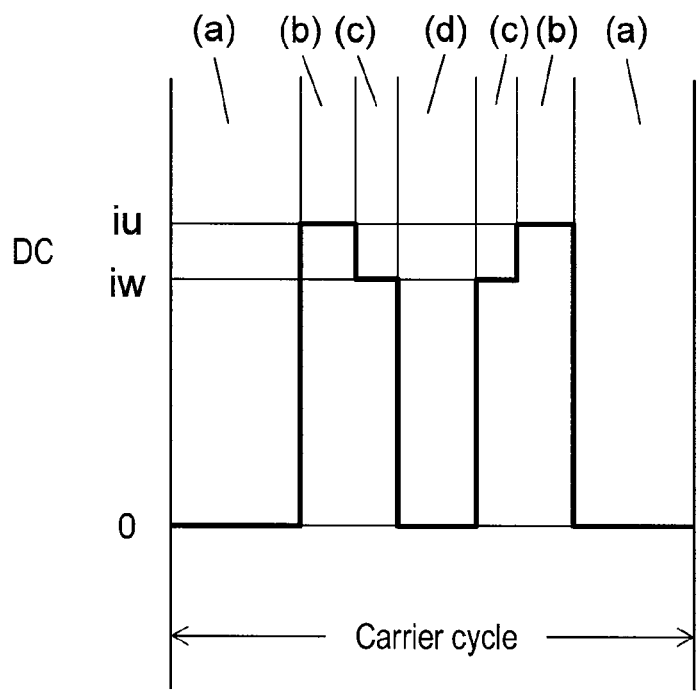
FIG. 8 shows a waveform of DC detected in a carrier cycle in the case above.

FIG. 8 shows the waveform of DC at a phase with the negative (−) sign in FIG. 2 in the states shown in FIG. 4 through FIG. 7. In the period of pattern (b), current sensor 6 detects U-phase current iU as the maximum current. In the period pattern (c), current sensor 6 detects W-phase current iW.

Next will be described the state on the phase with the positive (+) sign in FIG. 2. The V-phase (as the intermediate ON-period phase) carries current in the positive (+) direction. W-phase current iW carries the maximum amount of current.

Figure 9:
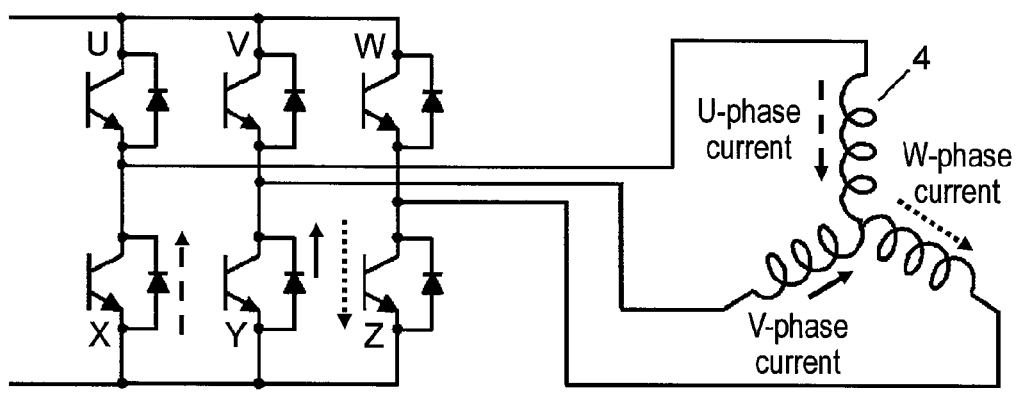
FIG. 9 is an electric circuit diagram showing the current path of pattern (a) in a case where the phase having the intermediate length of the ON-period carries positive (+) current.

In the period of pattern (a), all of upper-arm switching elements U, V, W are turned off, whereas all of lower-arm switching elements X, Y, Z are turned on. FIG. 9 shows the current flow in this state. U-phase current iU and V-phase current iV flow from the diodes disposed parallel to lower-arm switching elements X and Y, respectively, to stator winding 4. W-phase current iW flows from stator winding 4 to lower-arm switching element Z. Therefore, current sensor 6 carries no current to detect.

Figure 10:
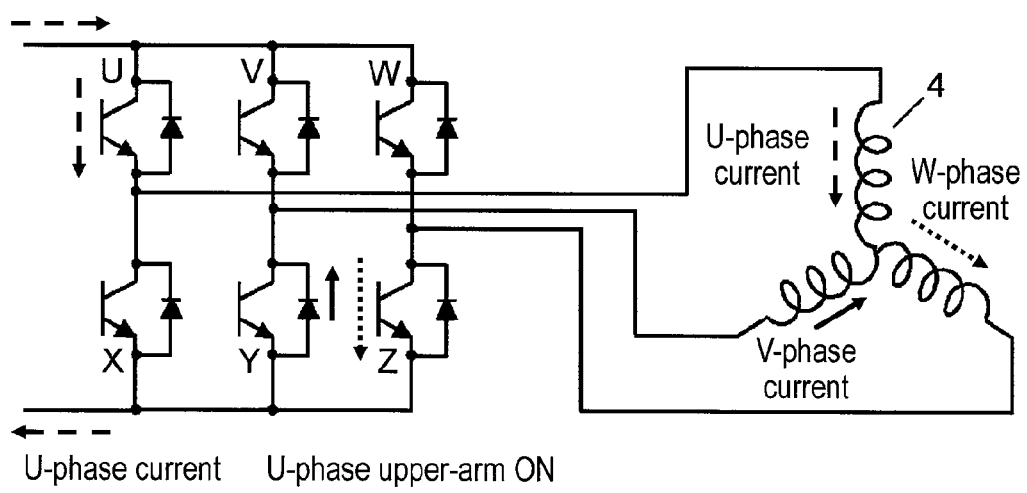
FIG. 10 is an electric circuit diagram showing the current path of pattern (b) in the case above.

In the period of pattern (b), upper-arm switching element U and lower-arm switching elements Y, Z are turned on. FIG. 10 shows the current flow in this state. In this period, U-phase current iU flows from upper-arm switching element U to stator winding 4. V-phase current iV flows from the diode disposed parallel to lower-arm switching element Y to stator winding 4. W-phase current iW flows from stator winding 4 to lower-arm switching element Z. That is, current sensor 6 detects U-phase current iU.

Figure 11:
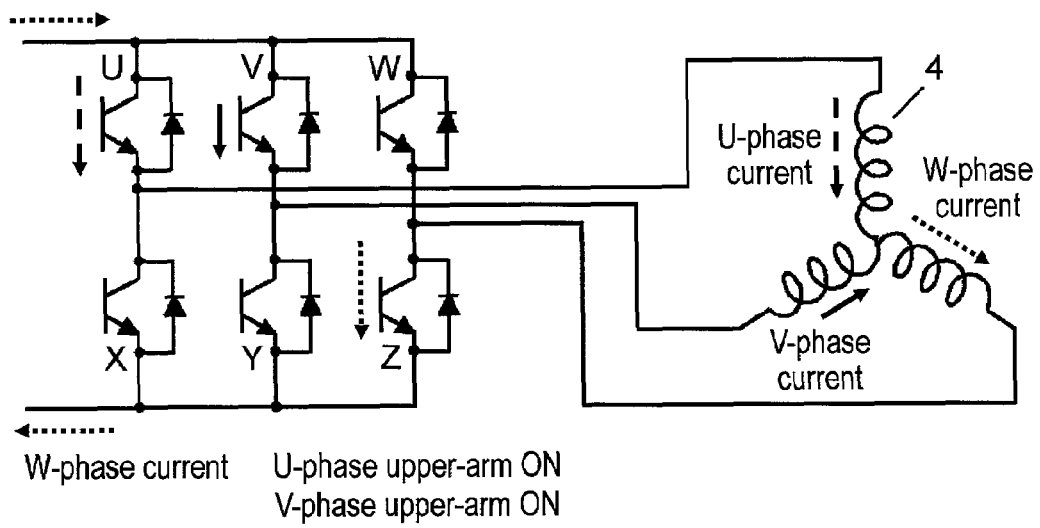
FIG. 11 is an electric circuit diagram showing the current path of pattern (c) in the case above.

In the period of pattern (c), upper-arm switching elements U, V and lower-arm switching element Z are turned on. FIG. 11 shows the current flow in this state. In this period, U-phase current iU and V-phase current iV flow from upper-arm switching elements U and V, respectively, to stator winding 4. W-phase current iW flows from stator winding 4 to lower-arm switching element Z. That is, current sensor 6 detects W-phase current iW.

Figure 12:
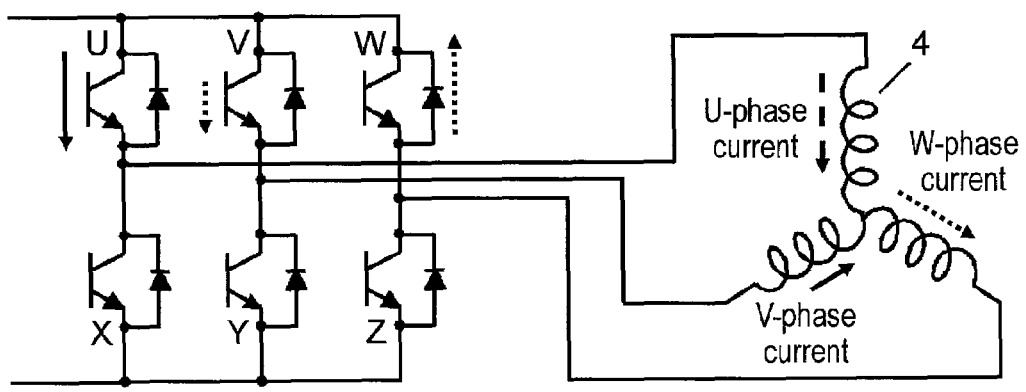
FIG. 12 is an electric circuit diagram showing the current path of pattern (d) in the case above.

In the period of pattern (d), all of upper-arm switching elements U, V, W are turned on, whereas all of lower-arm switching elements X, Y, Z are turned off. FIG. 12 shows the current flow in this state. U-phase current iU and V-phase current iV flow from upper-arm switching elements U and V, respectively, to stator winding 4. W-phase current iW flows from stator winding 4 to the diode disposed parallel to upper-arm switching element W. That is, current sensor 6 carries no current to detect.

Figure 13:
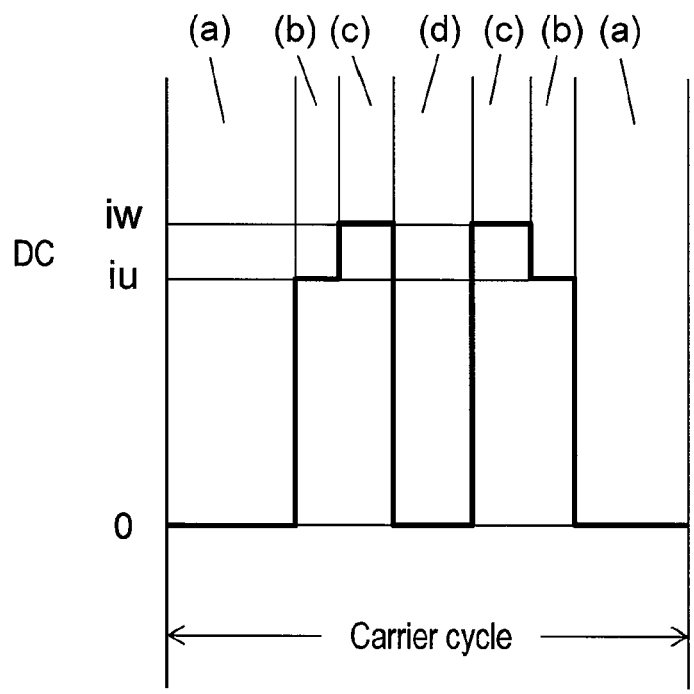
FIG. 13 shows a waveform of DC detected in a carrier cycle in the case above.

FIG. 13 shows the waveform of DC at a phase with the positive (+) sign in FIG. 2 in the states shown in FIG. 9 through FIG. 12. As is the same as in FIG. 8, current sensor 6 detects U-phase current iU in the period of pattern (b) and detects W-phase current iW in the period pattern (c).

From the current flow of each phase shown in FIGS. 4 through 13, the ON/OFF state of upper-arm switching elements U, V, W tells that which phase-current is detectable by current sensor 6. That is, when only one phase is turned on, current sensor 6 detects the current corresponding to the phase; when two phases are turned on, current sensor 6 detects the current corresponding to the remaining phase; and when all three phases are turned on or off, no current is detected.

If there is no time lag between the ON/OFF-signal fed from control circuit 7 and the ON/OFF operation of each switching element, control circuit 7 can detect that the current signal fed from current sensor 6 corresponds to which phase-current according to the ON/OFF-signal transmitted to the switching elements.

In reality, however, a time lag arises between the ON/OFF-signal fed from control circuit 7 and the ON/OFF operation of each switching element due to circuit characteristics and the like. Besides, the following also play a part in producing the time lag: response characteristics of the switching elements; a dead time between the upper-arm switching elements and the lower-arm switching elements. Therefore, the timing of phase-current detection by current sensor 6 according to the ON/OFF-signals from control circuit 7 should be determined in consideration of the aforementioned factors.

Figure 14:
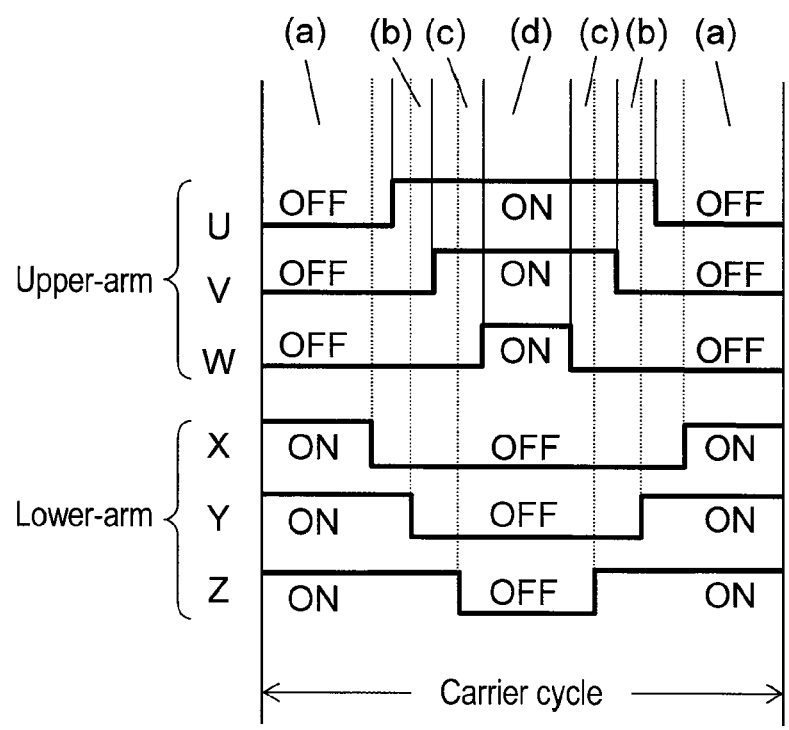
FIG. 14 is a timing chart of the ON-period (including a dead time) of each phase.

FIG. 14 is a timing chart including a dead time that is not shown in FIG. 3. Taking ON-time tn and OFF-time tf (of a switching element) into consideration, the description hereinafter will be focused on change in DC shown in FIGS. 8 and 13.

Figure 15:
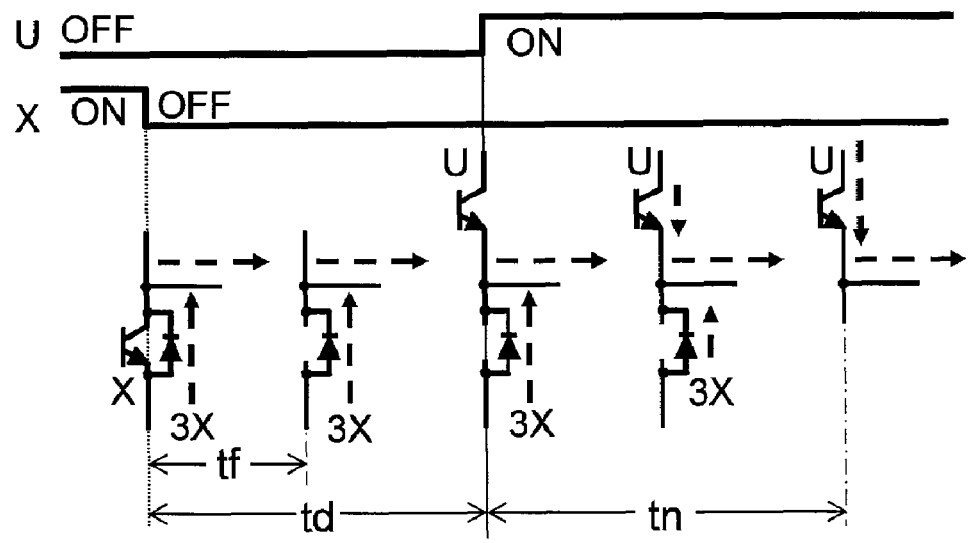
FIG. 15 shows a transition of U-phase current from the lower-arm to the upper-arm switching elements in a case where the phase having the intermediate length of the ON-period carries negative (−) current.

First will be described the state at a phase represented by the negative (−) sign shown in FIG. 2, which corresponds to the state in FIG. 8. V-phase current iV of the intermediate ON-period phase flows in the negative (−) direction. FIG. 15 illustrates a transition of U-phase current iU from the lower-arm to the upper-arm switching elements. In the drawing, the ON/OFF state of switching element U and switching element X is shown in the upper part and the phase-current flowing the circuit in the state is shown in the lower part. The current flow in the circuit before lower-arm switching element X receives an OFF-signal is shown in FIG. 4. At that point in time when lower-arm switching element X receives the OFF-signal, U-phase current iU flows through diode 3X disposed parallel to switching element X to stator winding 4. The upper-arm switching elements are in the OFF state and therefore not shown in the diagram of FIG. 15. After a lapse of OFF-time tf of lower-arm switching element X, upper-arm switching element U is still in the OFF state; U-phase current iU flows through diode 3X to stator winding 4. At this point of time, lower-arm switching element X is in the OFF state and therefore not shown in the diagram.

On the expiration of dead time td after the OFF-signal is transmitted to lower-arm switching element X, an ON-signal is transmitted to upper-arm switching element U. In response to the signal, U-phase current iU flowing through diode 3X starts to move toward upper-arm switching element U and completes the transition by ON-time tn elapses after upper-arm switching element U turns on. The state at that point of time is shown in FIG. 5. Considering the transition of U-phase current, current detection has to be carried out at a point after a lapse of ON-time tn from the On-signal.

Figure 16:
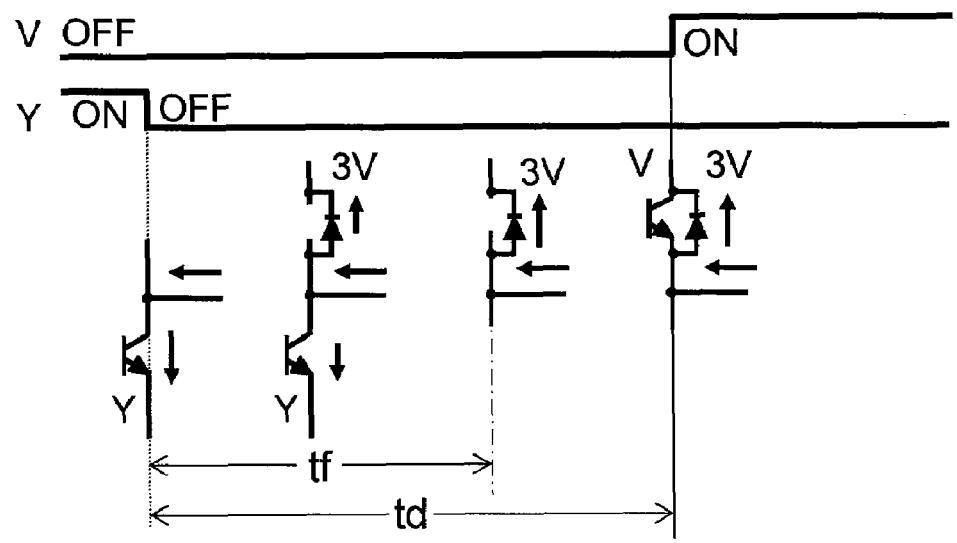
FIG. 16 shows a transition of V-phase current from the lower-arm to the upper-arm switching elements in the case above.

FIG. 16 illustrates a transition of V-phase current iV from the lower-arm to the upper-arm switching elements. At that point in time when lower-arm switching element Y receives the OFF-signal, V-phase current iV flows through stator winding 4 to lower-arm switching element Y. V-phase current iV starts to move toward diode 3V disposed parallel to upper-arm switching element V and completes the transition by OFF-time tf elapses after lower-arm switching element Y turns off. The state at that point of time is shown in FIG. 6. Dead time td for preventing short-circuit between the upper-arm and lower-arm switching elements is determined to be longer than OFF-time tf; the transition of V-phase current iV has completed after dead time td from the OFF-signal to lower-arm switching element Y. Considering this, current detection can be carried out at that point in time when the ON-signal to upper-arm switching element V is supplied (i.e., on the expiration of dead time td after the OFF-signal to lower-arm switching element Y).

Figure 17:
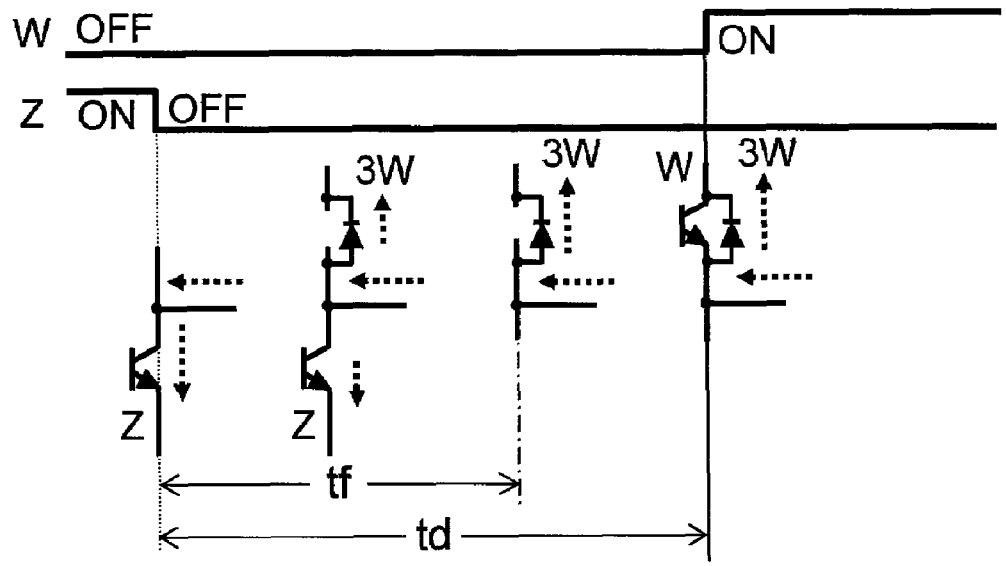
FIG. 17 shows a transition of W-phase current from the lower-arm to the upper-arm switching elements in the case above.

FIG. 17 illustrates a transition of W-phase current iW from the lower-arm to the upper-arm switching elements. As is in the case of V-phase current iV of FIG. 16, W-phase current iW starts to move toward diode 3W disposed parallel to upper-arm switching element W and completes the transition by OFF-time tf elapses after lower-arm switching element Z turns off. The state at that point of time is shown in FIG. 7. Therefore, phase current cannot be detected.

Figure 18:
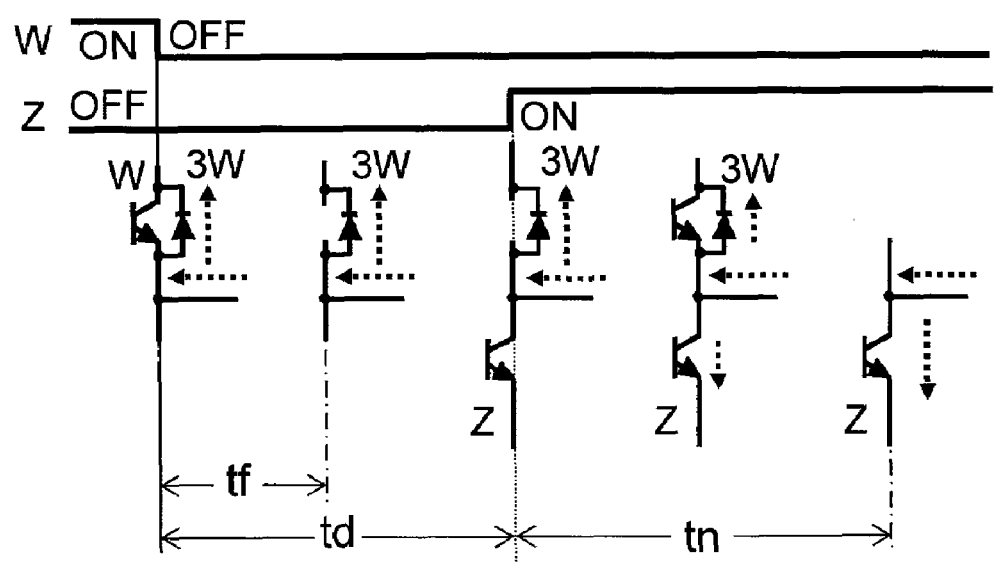
FIG. 18 shows a transition of W-phase current from the upper-arm to the lower-arm switching elements in the case above.

FIG. 18 illustrates a transition of W-phase current iW from the upper-arm to the lower-arm switching elements. The current flow in the circuit before upper-arm switching element W receives an OFF-signal is shown in FIG. 7. At that point in time when upper-arm switching element W receives the OFF-signal, W-phase current iW flows through stator winding 4 to diode 3W disposed parallel to upper-arm switching element W. The lower-arm switching elements are in the OFF state and therefore not shown in the diagram of FIG. 18. After a lapse of OFF-time tf of upper-arm switching element W, lower-arm switching element Z is still in the OFF state; W-phase current iW flows through stator winding 4 to diode 3W. At this point of time, upper-arm switching element W is in the OFF state and therefore not shown in the diagram.

On the expiration of dead time td after the OFF-signal is transmitted to upper-arm switching element W, an ON-signal is transmitted to lower-arm switching element Z. In response to the signal, W-phase current iW flowing through diode 3W starts to move toward lower-arm switching element Z and completes the transition by ON-time tn elapses after lower-arm switching element Z turns on. The state at that point of time is shown in FIG. 6. Considering the transition of W-phase current, current detection has to be carried out after a lapse of (td+tn) after the OFF-signal to upper-arm switching element W.

Figure 19:
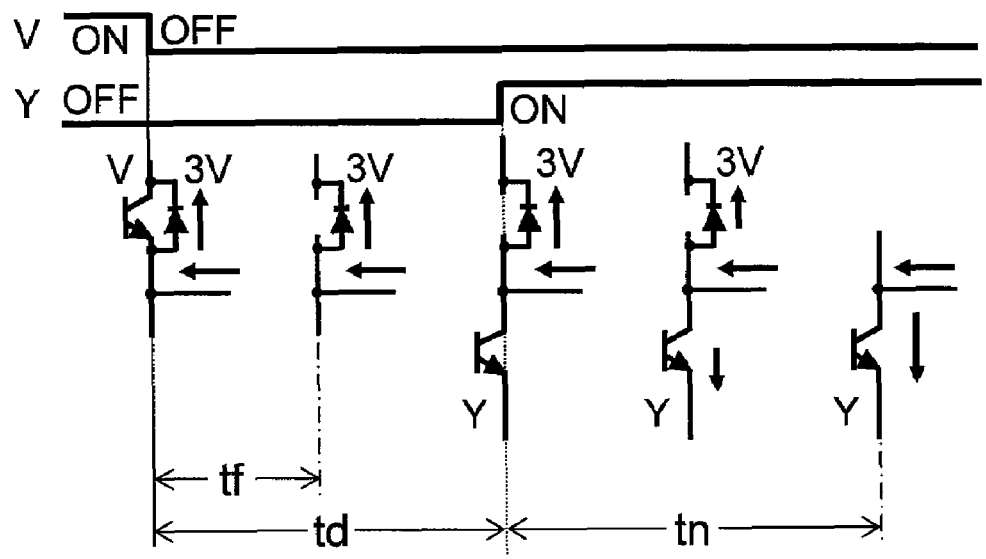
FIG. 19 shows a transition of V-phase current from the upper-arm to the lower-arm switching elements in the case above.

FIG. 19 illustrates a transition of V-phase current iV from the upper-arm to the lower-arm switching elements. As is in the case of W-phase current iW of FIG. 18, the transition completes after ON-time tn of lower-arm switching element Y has elapsed. The state at that point of time is shown in FIG. 5. Considering the transition of U-phase current iU, the current detection has to be carried out after a lapse of (td+tn) after the OFF-signal to upper-arm switching element V.

Figure 20:
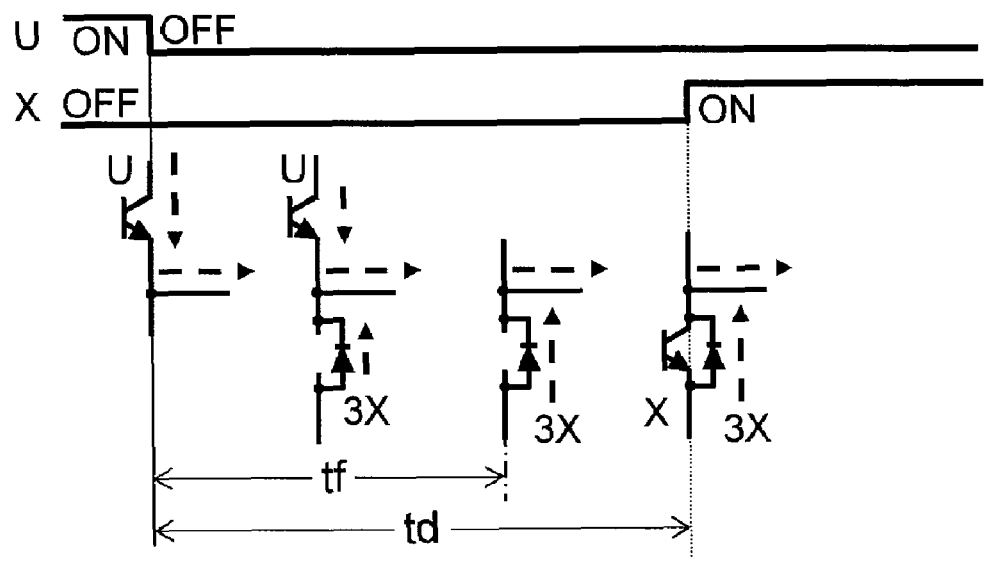
FIG. 20 shows a transition of U-phase current from the upper-arm to the lower-arm switching elements in the case above.

FIG. 20 illustrates a transition of U-phase current iU from the upper-arm to the lower-arm switching elements. At that point in time when upper-arm switching element U receives the OFF-signal, U-phase current iU flows through upper-arm switching element U to stator winding 4. U-phase current iU starts to move toward diode 3X disposed parallel to lower-arm switching element X and completes the transition after OFF-time tf of upper-arm switching element U has elapsed. The state at that point of time is shown in FIG. 4. Therefore, phase current cannot be detected.

Figure 21:
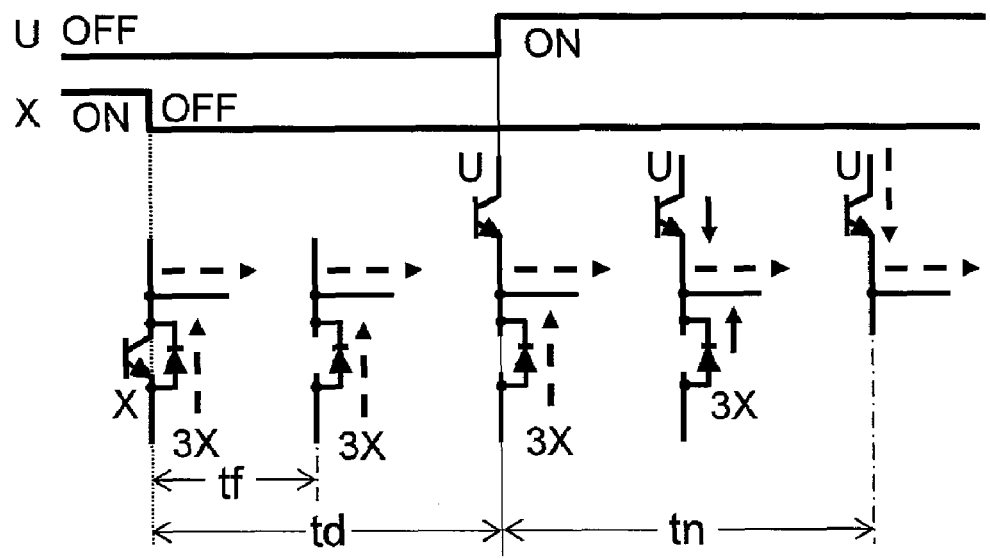
FIG. 21 shows a transition of U-phase current from the lower-arm to the upper-arm switching elements in a case where the phase having the intermediate length of the ON-period carries positive (+) current.

Next will be described the state at a phase represented by the positive (+) sign shown in FIG. 2, which corresponds to the state in FIG. 13. V-phase current iV of the intermediate ON-period phase flows in the positive (+) direction. FIG. 21 illustrates a transition of U-phase current iU from the lower-arm to the upper-arm switching elements. The transition timing of FIG. 21 is the same as that of FIG. 15 because of having no difference in the flowing direction of U-current iU (although having difference in magnitude of the current). The current flow in the circuit before lower-arm switching element X receives an OFF-signal is shown in FIG. 9. The transition completes after ON-time tn of upper-arm switching element U has elapsed. The state at that point of time is shown in FIG. 10. Considering the transition of U-phase current iU, current detection has to be carried out at a point after a lapse of ON-time tn from the ON-signal to upper-arm switching element U.

Figure 22:
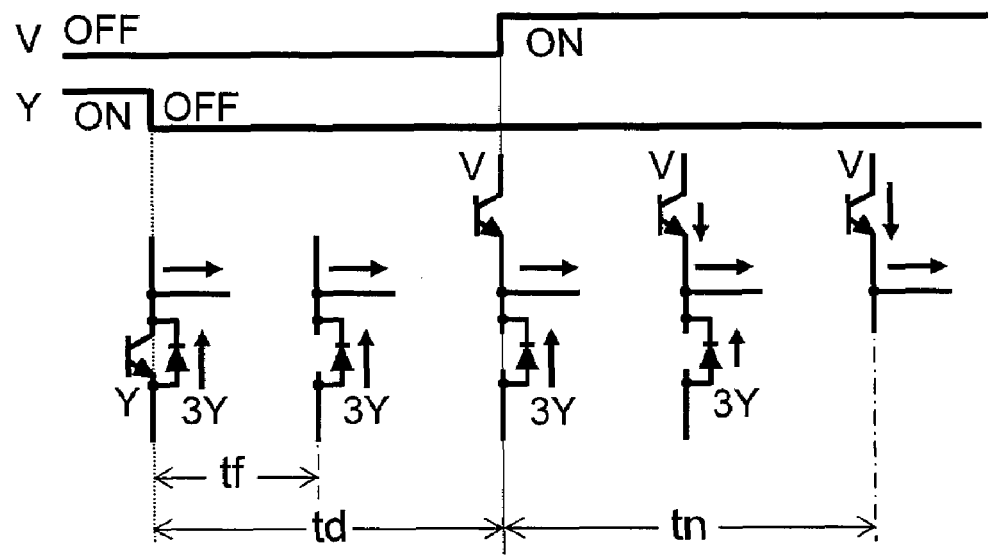
FIG. 22 shows a transition of V-phase current from the lower-arm to the upper-arm switching elements in the case above.

FIG. 22 illustrates a transition of V-phase current iV from the lower-arm to the upper-arm switching elements. Compared to the case of FIG. 16, the current flow of FIG. 22 is opposite in direction; the transition timing of FIG. 22 differs from that of FIG. 16. The transition timing of FIG. 22 is the same as those of FIG. 15 and FIG. 21 because of having no difference in the flowing direction of V-phase current iV (although having difference in magnitude of the current). At that point in time when lower-arm switching element Y receives the OFF-signal, V-phase current iV flows through diode 3Y disposed parallel to upper-arm switching element Y to stator winding 4. The upper-arm switching elements are in the OFF state and therefore not shown in the diagram of FIG. 22. After a lapse of OFF-time tf of lower-arm switching element Y, upper-arm switching element V is still in the OFF state; V-phase current iV flows through diode 3Y to stator winding 4. At this point of time, lower-arm switching element Y is in the OFF state and therefore not shown in the diagram.

On the expiration of dead time td after the OFF-signal is transmitted to lower-arm switching element Y, an ON-signal is transmitted to upper-arm switching element V. In response to the signal, V-phase current iV flowing through diode 3Y starts to move toward upper-arm switching element V and completes the transition after ON-time tn of upper-arm switching element V has elapsed. The state at that point of time is shown in FIG. 11. Considering the transition of V-phase current iV, current detection has to be carried out after ON-time tn from the ON-signal to upper-arm switching element V.

Figure 23:
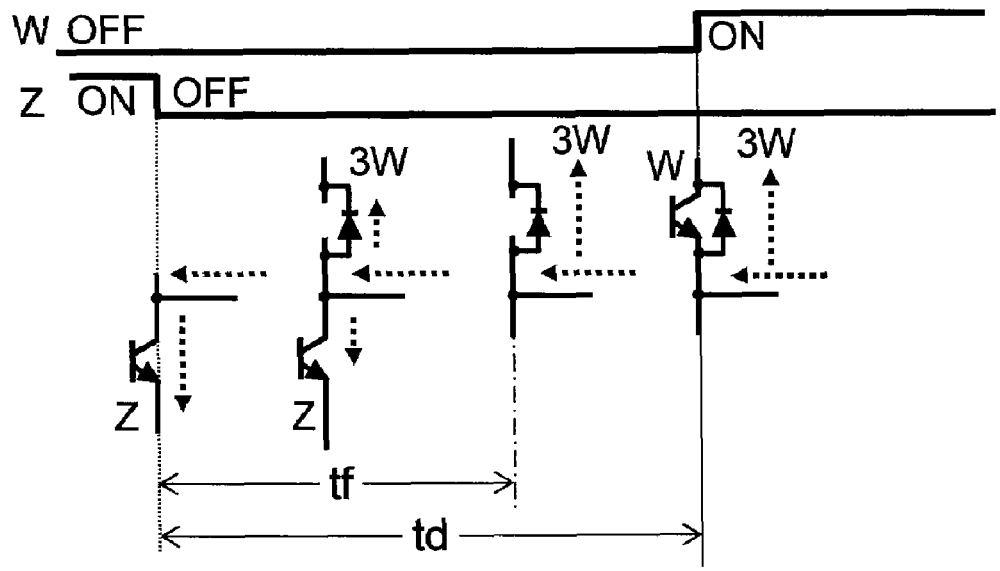
FIG. 23 shows a transition of W-phase current from the lower-arm to the upper-arm switching elements in the case above.

FIG. 23 illustrates a transition of W-phase current iW from the lower-arm to the upper-arm switching elements. The transition timing of FIG. 23 is the same as that of FIG. 17 because of having no difference in the flowing direction of W-phase current iW (although having difference in magnitude of the current). W-phase current iW starts to move toward diode 3W disposed parallel to upper-arm switching element W and completes the transition after OFF-time tf of lower-arm switching element Z has elapsed. The state at that point of time is shown in FIG. 12. Therefore, phase current cannot be detected.

Figure 24:
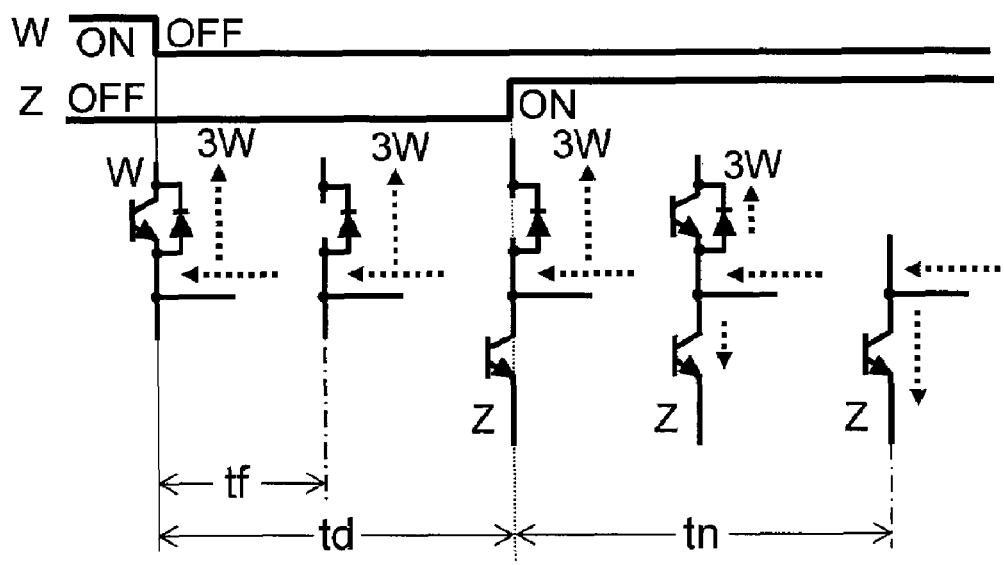
FIG. 24 shows a transition of W-phase current from the upper-arm to the lower-arm switching elements in the case above.

FIG. 24 illustrates a transition of W-phase current iW from the upper-arm to the lower-arm switching elements. The transition timing of FIG. 24 is the same as that of FIG. 18 because of having no difference in the flowing direction of W-phase current iW (although having difference in magnitude of the current). The transition completes after ON-time tn of lower-arm switching element Z has elapsed. The state at that point of time is shown in FIG. 11. Considering the transition of W-phase current iW, the current detection has to be carried out after a lapse of (td+tn) after the OFF-signal to upper-arm switching element W.

Figure 25:
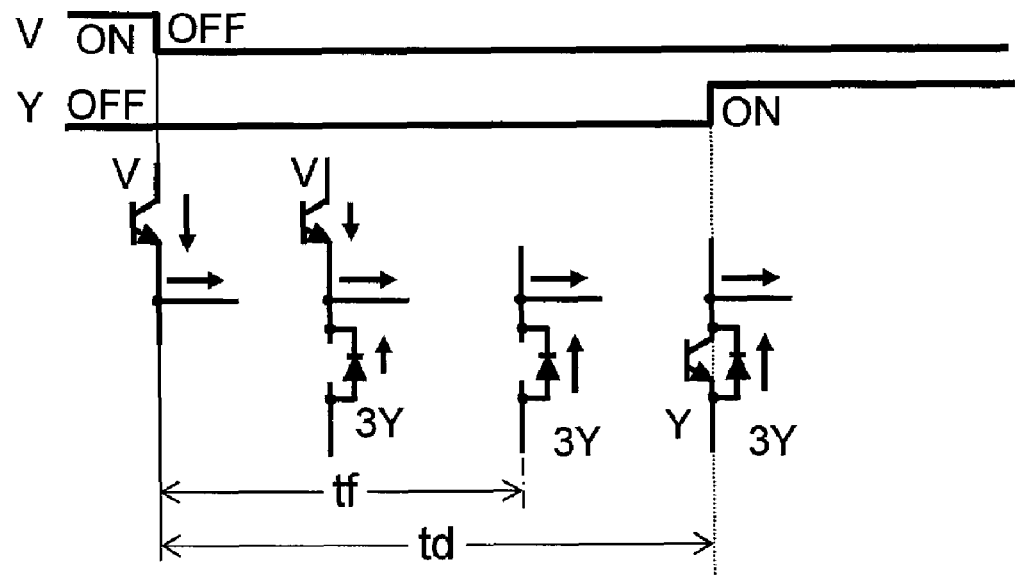
FIG. 25 shows a transition of V-phase current from the upper-arm to the lower-arm switching elements in the case above.

FIG. 25 illustrates a transition of V-phase current iV from the upper-arm to the lower-arm switching elements. Compared to the case of FIG. 19, the current flow of FIG. 25 is opposite in direction; the transition timing of FIG. 25 differs from that of FIG. 19. The transition timing of FIG. 25 is the same as that of FIG. 20 because of having no difference in the flowing direction of V-current iV (although having difference in magnitude of the current). At that point in time when upper-arm switching element V receives the OFF-signal, V-phase current iV flows through upper-arm switching element V to stator winding 4. V-phase current iV starts to move toward diode 3Y disposed parallel to lower-arm switching element Y and completes the transition after OFF-time tf of upper-arm switching element V has elapsed. The state at that point of time is shown in FIG. 10. Dead time td for preventing short-circuit between the upper-arm and lower-arm switching elements is determined to be longer than OFF-time tf; the transition of V-phase current iV has completed after dead time td from the OFF-signal to upper-arm switching element V. Considering this, current detection can be carried out on the completion of dead time td from the OFF-signal to upper-arm switching element V.

Figure 26:
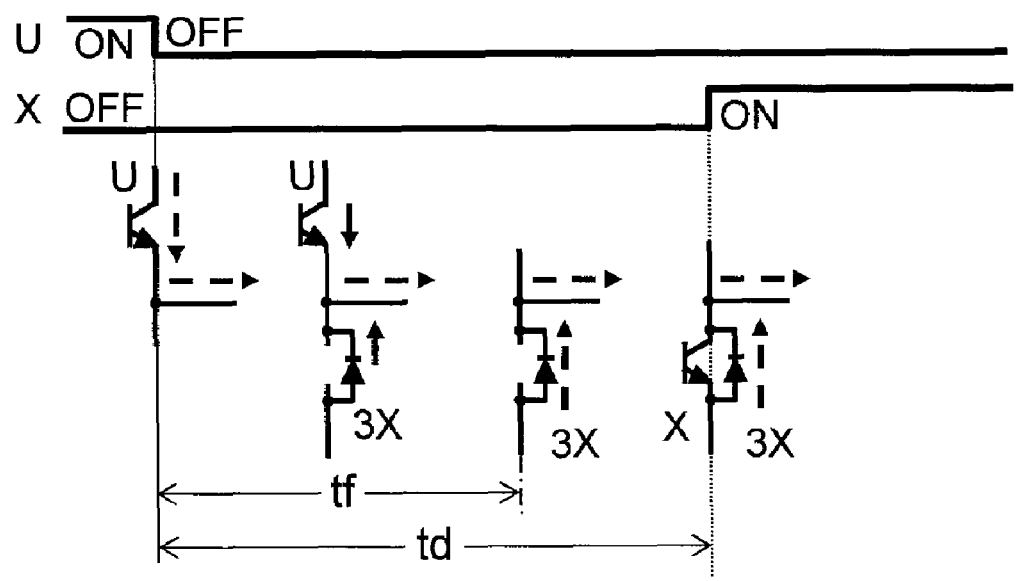
FIG. 26 shows a transition of U-phase current from the upper-arm to the lower-arm switching elements in the case above.

FIG. 26 illustrates a transition of U-phase current iU from the upper-arm to the lower-arm switching elements. The transition timing of FIG. 26 is the same as that of FIG. 20 because of having no difference in the flowing direction of U-current iU (although having difference in magnitude of the current). The transition completes after OFF-time tf of upper-arm switching element U has elapsed. The state at that point of time is shown in FIG. 9. Therefore, phase current cannot be detected.

Figure 27:
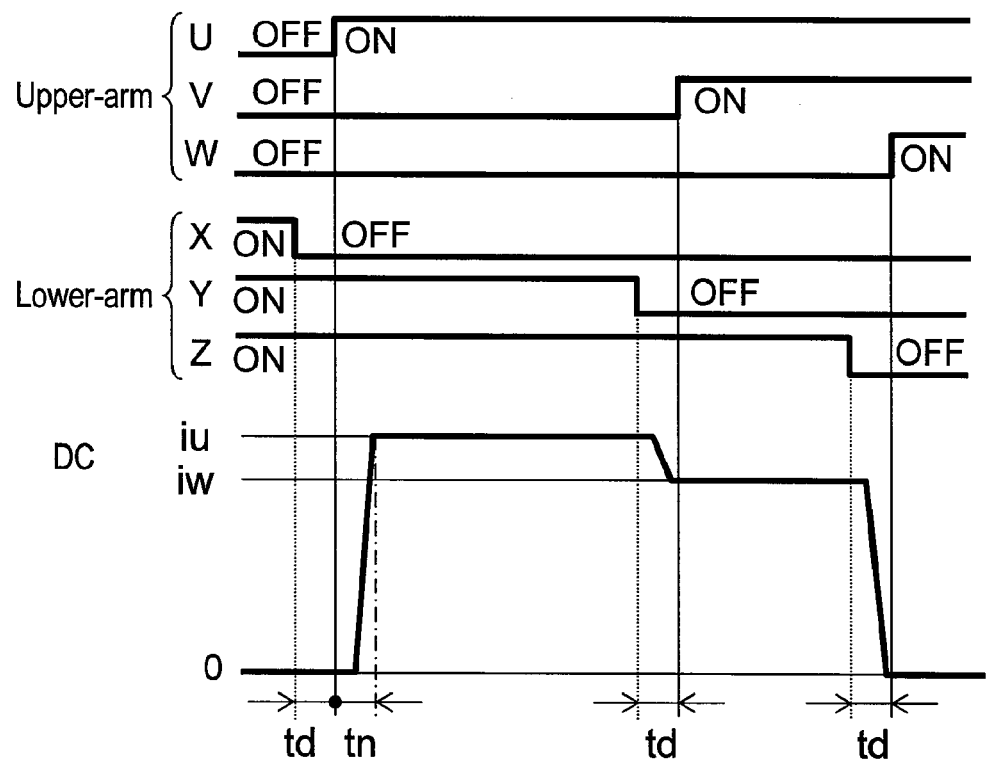
FIG. 27 shows a detailed waveform of DC detected in the first half of a carrier cycle in a case where the phase having the intermediate length of the ON-period carries negative (−) current.
Figure 28:
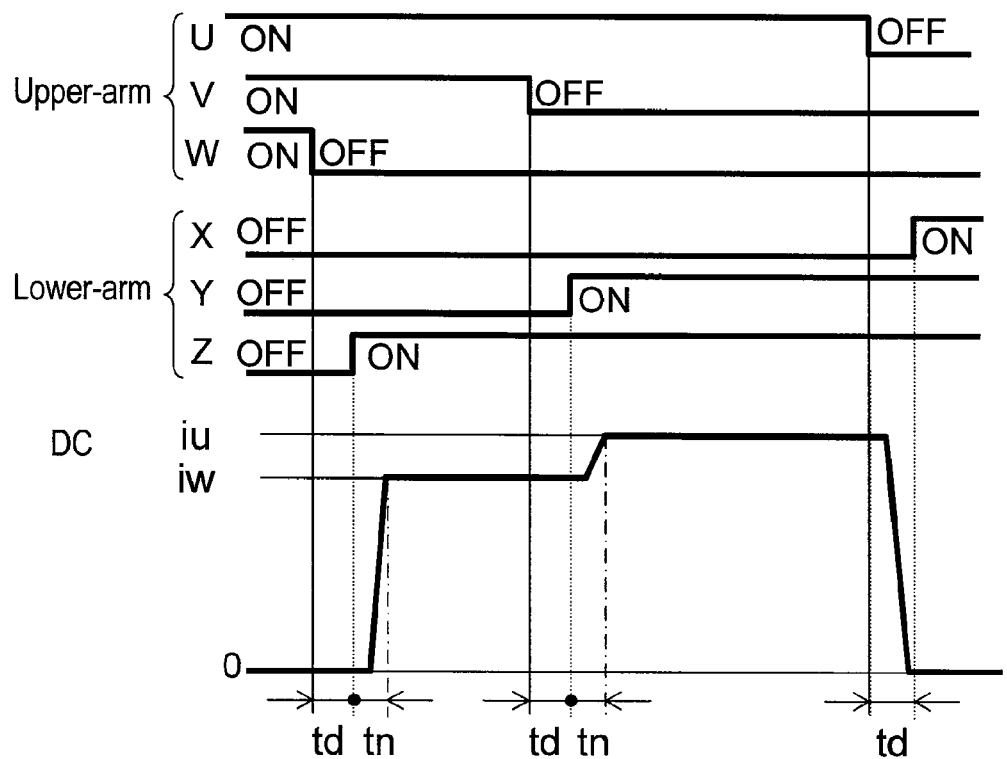
FIG. 28 shows a detailed waveform of DC detected in the latter half of the carrier cycle in the case above.

FIG. 27 shows the relationship between the ON/OFF state of the switching elements and the behavior of DC. FIG. 27 incorporates each state shown in FIGS. 15, 16 and 17 into its upper part. The lower part shows details of the DC behavior in the first half of a carrier cycle shown in FIG. 8 (where V-phase current iV flows in the negative (−) direction). As is shown in FIG. 27, there is no change in the behavior of DC (i.e., U-phase current iU) for a while even after an ON-signal has been transmitted to upper-arm switching element U. This is caused by delay in the filtering circuit and the drive circuit between control circuit 7 and switching element U. Similarly, the slow response of DC to the OFF-signals transmitted to lower-arm switching elements Y, Z is explained by the delay. ON-time tn in FIG. 28 represents a turn-on time of a switching element plus the delay above. Similarly, OFF-time tf described earlier represents a turn-off time of a switching element plus the delay.

Here will be described conditions of ON-period correction for detecting current according to the ON/OFF timing of upper-arm switching elements U, V, and W. Now suppose that the time required for control circuit 7 to receive a current value detected by current sensor 6 is represented by tk.

Suppose that the period from the ON-signal to switching element U to the ON-signal to switching element V—where the ON-signal is supplied to only switching element U—is represented by L1. In the period, ON-time tn of switching element U and dead time td just before the ON-signal to switching element V are not appropriate for current detection. To carry out current detection with reliability, the time represented by td+tn+tk is the least amount of time for L1. Here suppose that CL1 has the value of td+tn+tk.

Suppose that the period from the ON-signal to switching element V to the ON-signal to switching element W—where the ON-signal is supplied to two switching elements U and V—is represented by L2. In the period, dead time td just before the turn-on time of switching element W is not appropriate for current detection. To carry out current detection with reliability, the time represented by td+tk is the least amount of time for L2. Here suppose that CL2 has the value of td+tk.

FIG. 28 shows the relationship between the ON/OFF state of the switching elements and the behavior of DC. FIG. 28 incorporates each state shown in FIGS. 18, 19 and 20 into its upper part. The lower part shows details of the DC behavior in the latter half of a carrier cycle shown in FIG. 8. Here will be described conditions of ON-period correction to be provided in the latter half of a carrier cycle. Suppose that the period from the OFF-signal to switching element W to the OFF-signal to switching element V—where the ON-signal is supplied to two switching elements U and V—is represented by R2. In the period, time td+tn after the OFF-signal to switching element W is not appropriate for current detection. On the other hand, current is detectable in dead time td after the OFF-signal to switching element V, provided that dead time td is larger than time tk. Dead time td, which depends on the characteristics of a large-type power device, is usually determined to be large enough for protecting the switching elements from short-circuiting. Therefore, it is reasonable to think that dead time td is larger than tk. To carry out current detection with reliability, the time represented by td+tn is the least amount of time for R2. Here suppose that CR2 has the value of td+tn.

Suppose that the period from the OFF-signal to switching element V to the OFF-signal to switching element U—where the ON-signal is supplied to only switching element U—is represented by R1. In the period, time td+tn after the OFF-signal to switching element V is not appropriate for current detection. To carry out current detection with reliability, the time represented by td+tn+tk is the least amount of time for R1. Here suppose that CR1 has the value of td+tn+tk.

Figure 29:
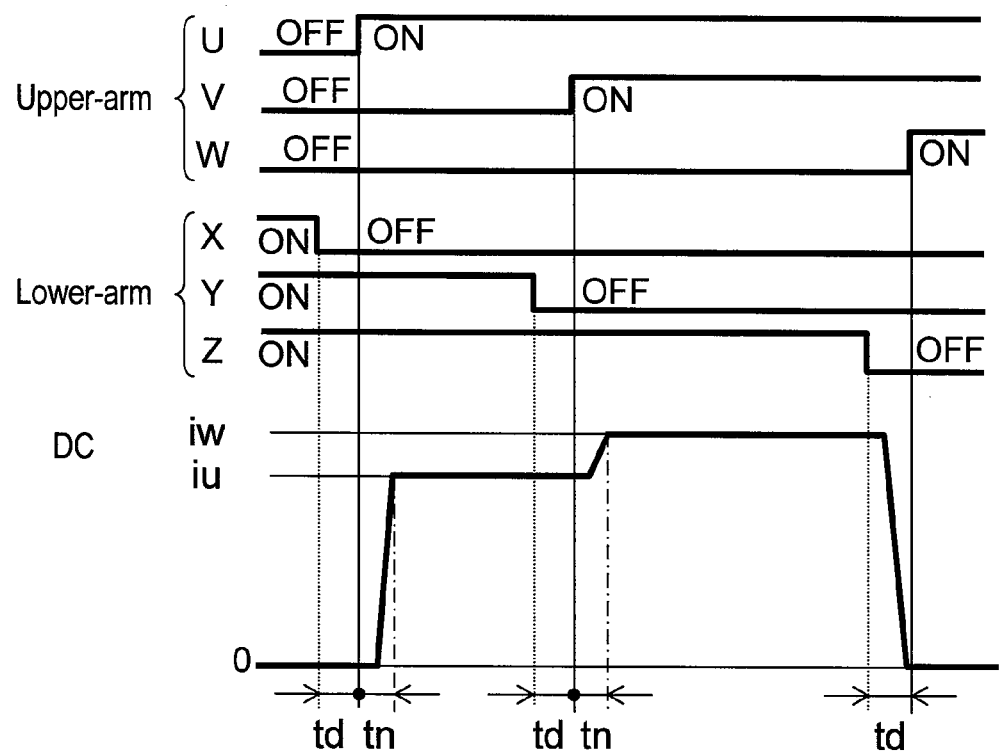
FIG. 29 shows a detailed waveform of DC detected in the first half of a carrier cycle in a case where the phase having the intermediate length of the ON-period carries positive (+) current.

FIG. 29 shows the relationship between the ON/OFF state of the switching elements and the behavior of DC. FIG. 29 incorporates each state shown in FIGS. 21, 22 and 23 into its upper part. The lower part shows details of the DC behavior in the first half of a carrier cycle shown in FIG. 13 (where V-phase current iV flows in the positive (+) direction). Suppose that the period from the ON-signal to switching element U to the ON-signal to switching element V—where the ON-signal is supplied to only switching element U—is represented by L1. In the period, time tn after the turn-on time of switching element U is not appropriate for current detection. On the other hand, current is detectable in dead time td just before the ON-signal to switching element V, provided that dead time td is larger than time tk. To carry out current detection with reliability, the time represented by td+tn is the least amount of time for L1. Here suppose that CL1 has the value of td+tn.

Suppose that the period from the ON-signal to switching element V to the ON-signal to switching element W—where the ON-signal is supplied to two switching elements U and V—is represented by L2. In the period, time tn after the ON-signal to switching element V and dead time td just before the ON-signal to switching element W are not appropriate for current detection. To carry out current detection with reliability, the time represented by td+tn+tk is the least amount of time for L2. Here suppose that CL2 has the value of td+tn+tk.

Figure 30:
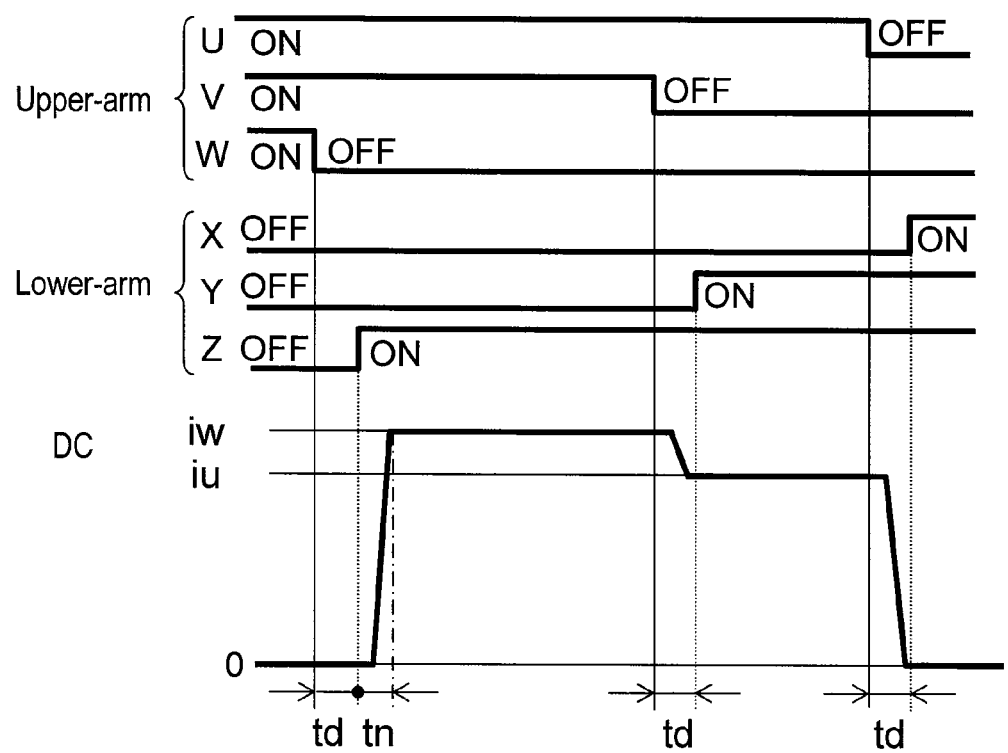
FIG. 30 shows a detailed waveform of DC detected in the latter half of the carrier cycle in the case above.

FIG. 30 shows the relationship between the ON/OFF state of the switching elements and the behavior of DC. FIG. 30 incorporates each state shown in FIGS. 24, 25 and 26 into its upper part. The lower part shows details of the DC behavior in the latter half of a carrier cycle shown in FIG. 13. Suppose that the period from the OFF-signal to switching element W to the OFF-signal to switching element V—where the ON-signal is supplied to two switching elements U and V—is represented by R2. In the period, time td+tn after the OFF-signal to switching element W is not appropriate for current detection. To carry out current detection with reliability, the time represented by td+tn+tk is the least amount of time for R2. Here suppose that CR2 has the value of td+tn+tk.

Suppose that the period from the OFF-signal to switching element V to the OFF-signal to switching element U—where the ON-signal is supplied to only switching element U—is represented by R1. In the period, dead time td after the OFF-signal to switching element V is not appropriate for current detection. To carry out current detection with reliability, the time represented by td+tk is the least amount of time for R1. Here suppose that CR1 has the value of td+tk.

Figure 31:
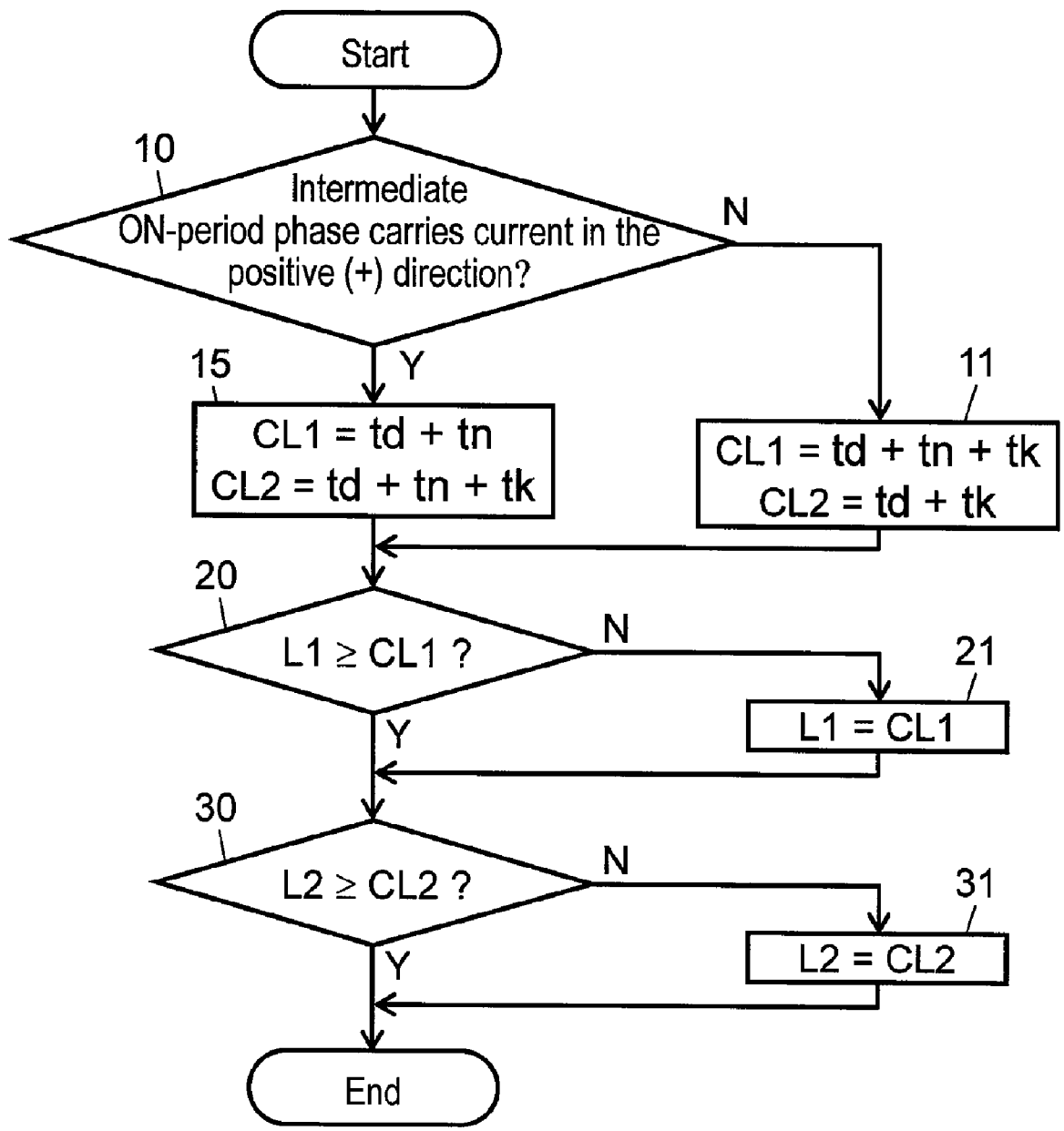
FIG. 31 is a flow chart illustrating correction on the ON-period in the first half of a carrier cycle according to the direction of the phase current of a phase having the intermediate length of the ON-period.

FIG. 31 is a flowchart illustrating the correction procedure provided in the first half of a carrier cycle in consideration of the timing charts of FIGS. 27 and 29. In step 10, the direction of the current flowing through the intermediate ON-period phase is judged whether positive (+) or negative (−), i.e., whether the current flows to the motor or flows from the motor. If the current flows in the negative (−) direction (i.e., "N" is taken at step 10), CL1=td+tn+tk and CL2=td+tk (as is described earlier with reference to FIG. 27) in step 11, and then the procedure goes to step 20. If the direction of the current is positive (+) (i.e., "Y" is taken at step 10), CL1=td+tn and CL2=td+tn+tk (as is described earlier with reference to FIG. 29) in step 15, and then the procedure goes to step 20.

Whether the current direction is positive or not is predictable from the current of the intermediate ON-period phase in the previous carrier cycle. Control circuit 7 detects phase current on a carrier-cycle basis and therefore can keep track of phases by calculation. That is, control circuit 7 can estimate the direction of the current flowing the intermediate ON-period phase in the carrier cycle in which phase-current detection should be carried. The phase of applied voltage, instead of the phase of current, can be used on the assumption that the phase of applied voltage is nearly equal to that of current. For example, as is shown in FIG. 2, the current flowing the intermediate ON-period phase reverses its direction at a phase of 120°. The judgment on the direction of current can be possible by checking whether current flows in a switching element or in a diode disposed parallel to the element.

Next, in step 20 of FIG. 31, time L1 in the current PWM (before correction) is compared to CL1. CL1 represents the minimum time required to detect current. If L1 is less than CL1 (i.e., "N" is taken at step 20), L1 is increased to CL1 in step 21; the increased amount corresponds to the amount of correction. After that, the procedure goes to step 30. If L1 is greater than CL1, no correction is provided and the procedure goes to step 30.

In step 30, time L2 in the current PWM (before correction) is compared to CL2. CL2 represents the minimum time required to detect current. If L2 is less than CL2 (i.e., "N" is taken at step 30), L2 is increased to CL2 in step 31; the increased amount corresponds to the amount of correction. If L2 is greater than CL2, no correction is provided and the procedure goes to end.

The correction procedure illustrated in the flowchart allows the current sensor to detect current of two phases (U-phase current iU and W-phase current iW, in this case) with a minimum amount of correction. The current of the remaining phase is obtained by the calculation described earlier.

In the case of current detection with no judgment on the direction of current, both of CL1 and CL2 need to at least equal to td+tn+tk. In contrast, according to the setting of time for current detection of the present invention, CL2=td+tk (for the negative direction of the current-flow in the intermediate ON-period phase) and CL1=td+tn (for the positive direction of the current-flow). That is, CL1 and CL2 have a smaller value than those used in the current detection with no judgment, which contributes to decreased ripple current and therefore decreased noise. For example, when td=2.5 μs; tn=2 μs; and tk=2 μs, both of L1 and L2 are decreased to 69% (=4.5 μs/6.5 μs).

In a case of the modulation with small output, i.e., the modulation with a modulation degree of 10%, L1 and L2 take a few microseconds in a carrier cycle of around 100 μs (i.e., a carrier frequency of around 10 kHz). Suppose that both of L1 and L2 take 3 μs as an example. In this case, CL1 takes 4.5 μs (=td+tn) and CL2 also takes 4.5 μs (=td+tk). The amount of correction in this case is obtained from the difference between CL1 (CL2) and L1 (L2): 1.5 μs (=4.5 μs−3 μs). According to the conventional correction, CL1 and CL2 need to at least equal to td+tn+tk; CL1 and CL2 take at least 6.5 μs. Therefore, the amount of correction needs 3.5 μs (=6.5 μs−3 μs). Compared to the conventional correction, the method of the present invention allows the amount of correction to decrease to less than half (i.e., 1.5 μs/3.5 μs=0.43). The correction method of the present invention is particularly effective in the modulation with a small modulation-degree (i.e., with a small output); the similar effect is also expected in the modulation with a modulation degree in the neighborhood of 20% to 30%.

Figure 32:
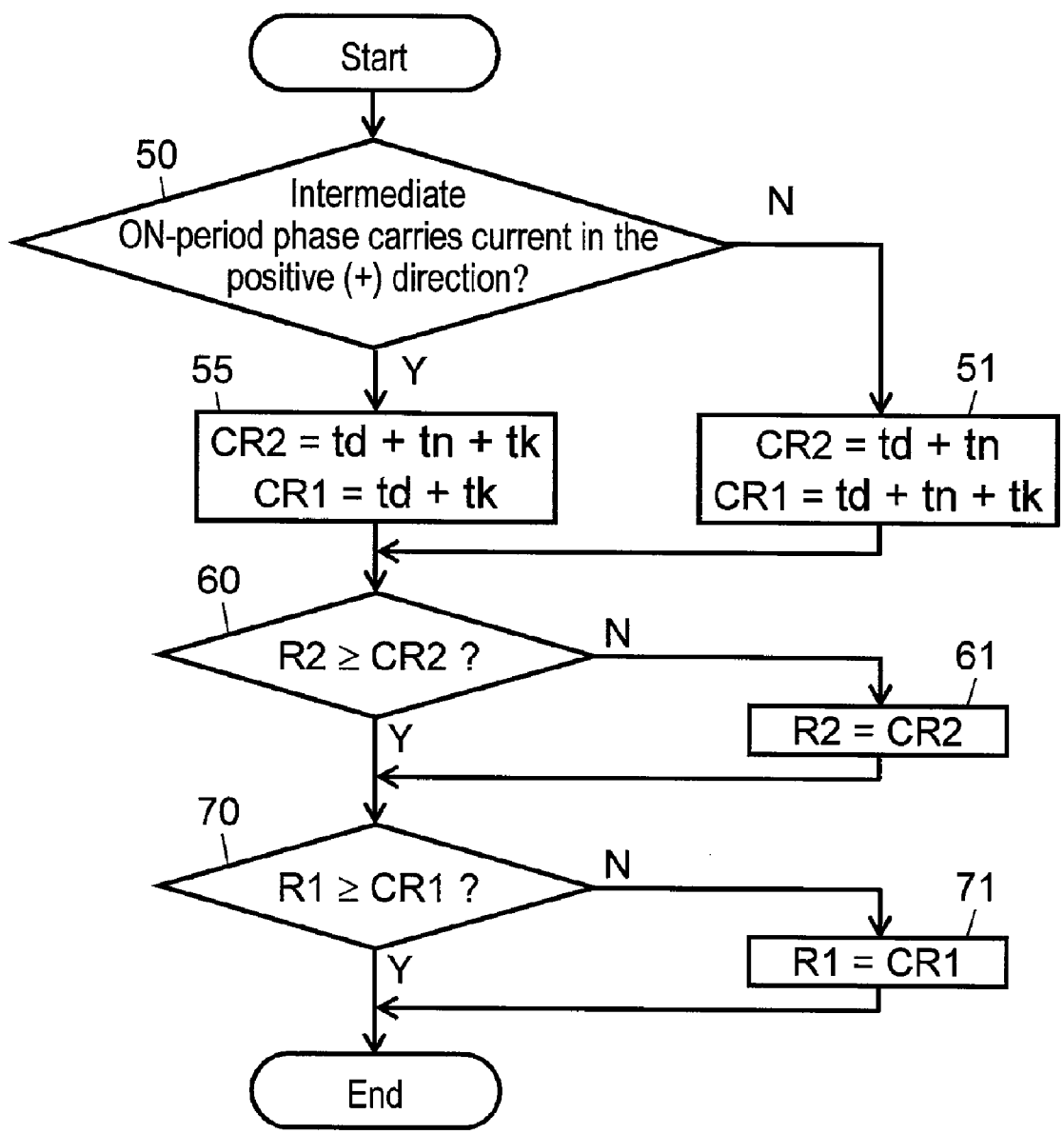
FIG. 32 is a flow chart illustrating correction on the ON-period in the latter half of the carrier cycle according to the direction of the phase current of a phase having the intermediate length of the ON-period.

FIG. 32 is a flowchart illustrating the correction procedure provided in the latter half of a carrier cycle in consideration of the timing charts of FIGS. 28 and 30. In the flowchart, each calculation in step 51 and step 55 is determined on the timing charts shown in FIG. 28 and FIG. 30, respectively. In the entire procedure and the effect to be obtained, the correction illustrated in FIG. 32 is the same as that in FIG. 31.

Although the example of the embodiment describes current detection of two phases (U-phase current iU and W-phase current iW), it is not limited thereto. The number of phases for detecting current, combinations of the phases (in a case of current detection for two-or-more phases), and detection timing (in the first half or in the latter half of a carrier cycle) can be determined with flexibility.

The following is an extension of the correction described above, by which further decrease in the amount of correction is expected. The timing charts shown in FIGS. 28 and 29 are described with the assumption that dead time td is larger than current detecting time tk. Since current detection is possible on the condition that dead time td at least equals to current detecting time tk, td can be replaced with tk in the following calculation: CL1=tn+tk (in step 15 of FIG. 31); CR2=tn+tk (in step 51 of FIG. 32). Besides, in FIG. 27, current detection is possible after OFF-time tf from the OFF-signal to switching element Y and until dead time td; similarly, in FIG. 30, current detection is possible after OFF-time tf from the OFF-signal to switching element V and until dead time td. That is, dead time td can be replaced with OFF-time tf as is in the following calculation: CL2=tf+tk (in step 11 of FIG. 31); CR1=tf+tk (in step 55 of FIG. 32). Furthermore, reducing delay time (caused by the filtering circuit and the drive circuit between control circuit 7 and the switching elements) from each value of CL1, CL2, CR1 and CR2 (in FIGS. 31 and 32) contributes to further decrease in the correction amount.

As described above, the timing charts shown in FIGS. 28 and 29 are described with the assumption that dead time td is larger than current detecting time tk. Even in a case where dead time td is smaller than current detecting time tk, td can be replaced with tk; CL1=tn+tk (in step 15 of FIG. 31); CR2=tn+tk (in step 51 of FIG. 32).

Although the description of the embodiment has focused on the minimum time required for current detection, the minimum setting can cause an inconveniency in which the current sensor detects ringing in current in transition. Determining the time to be a little bit longer so as to have a margin of time prevents the undesired detection.

Making a comparison between the flowcharts of correction procedures shown in FIGS. 31 and 32, the calculated values of step 11 (FIG. 31) equal to those of step 55 (FIG. 32), and the calculated values of step 15 (FIG. 31) equal to those of step 51 (FIG. 32). That is, if adding another conditional branch for judging whether the current detection is carried out in the first half of a carrier cycle or in the latter half of the cycle, the two flowcharts can be integrated into one routine having a common calculation step to share values, contributing to a simplified correction program.

Although the timing chart shows the case where upper-arm switching element V as the intermediate ON-period phase turns on after upper-arm switching element U as the maximum ON-period phase, the turn-on timing opposite to above (i.e., element V turns on ahead) may occur as a result of a special correction. The method of the present invention is basically applicable to the opposite case. In FIG. 27 (where V-phase current iV flows in the negative direction) and in FIG. 29 (where V-phase current iV flows in the positive direction), V-phase current iV is the first-detectable current. In the opposite case, a difference arises in the turn-on timing of FIG. 27, and therefore the timing chart of FIG. 27 is in need of replacement of the U-phase and the V-phase. On the other hand, the replacement of the U-phase and the V-phase has no influence on the turn-on timing shown in FIG. 29.

Second Exemplary Embodiment

Figure 33:
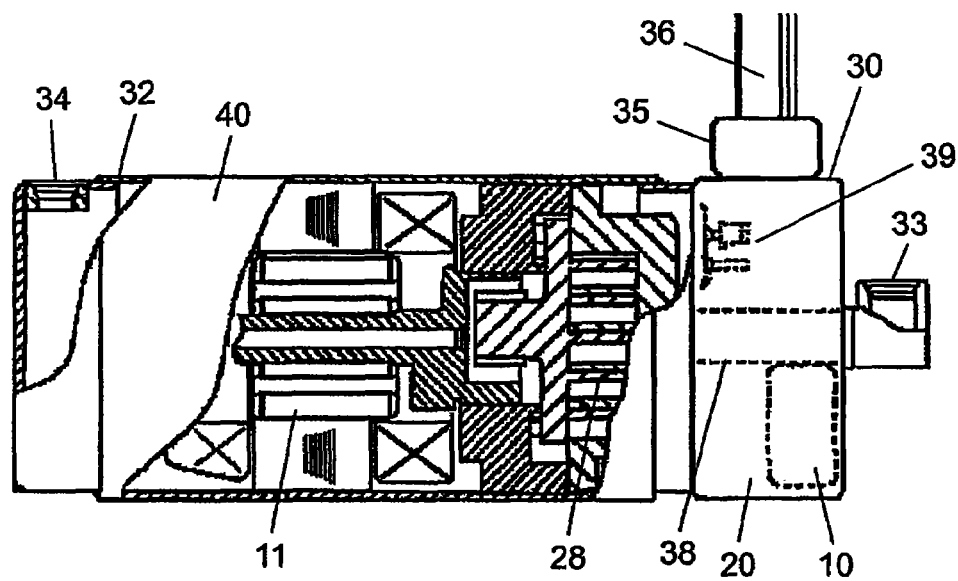
FIG. 33 is a sectional view of an electric compressor equipped with the inverter in accordance with the second exemplary embodiment.
Figure 34:
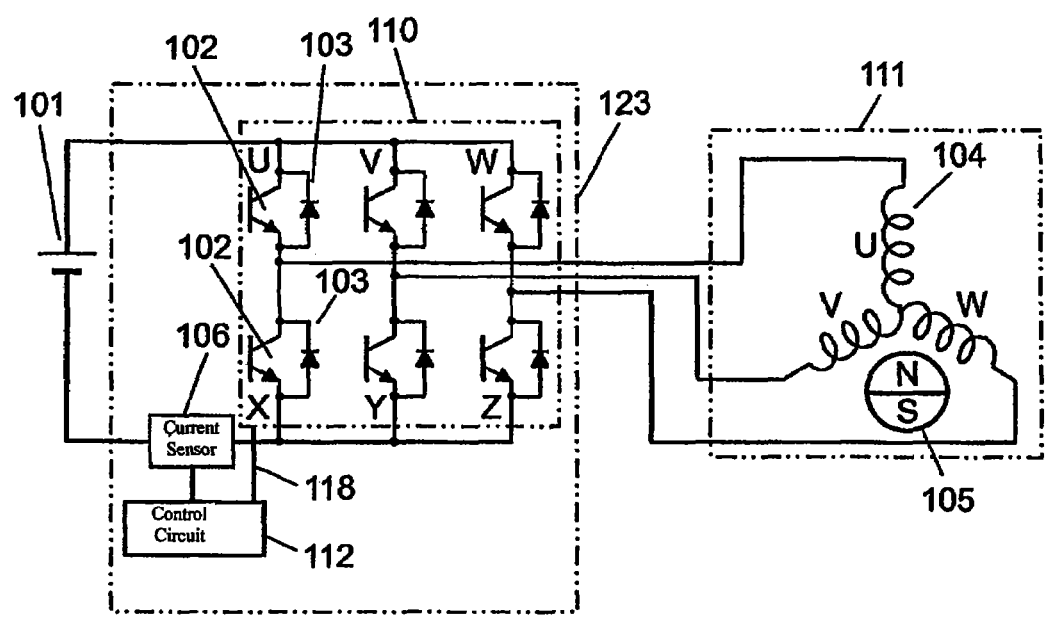
FIG. 34 is an electric circuit diagram showing an inverter that detects phase current with the use of a current sensor disposed on the power-supply line and the peripheral structure thereof.
Figure 35:
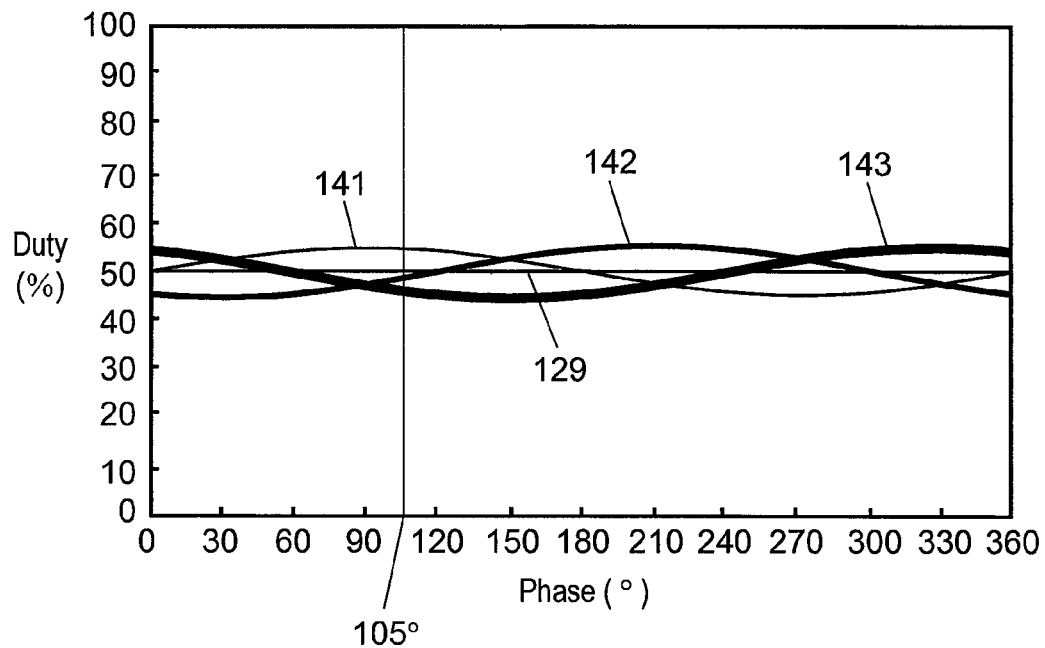
FIG. 35 shows modulated waves in each phase in three-phase modulation with a maximum modulation degree of 10%.
Figure 36A:
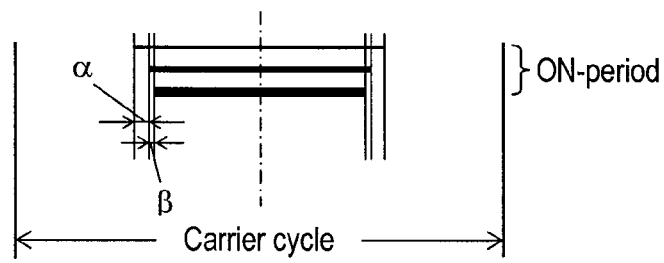
FIG. 36A shows the ON-period of each phase with no correction for phase-current detection.
Figure 36B:
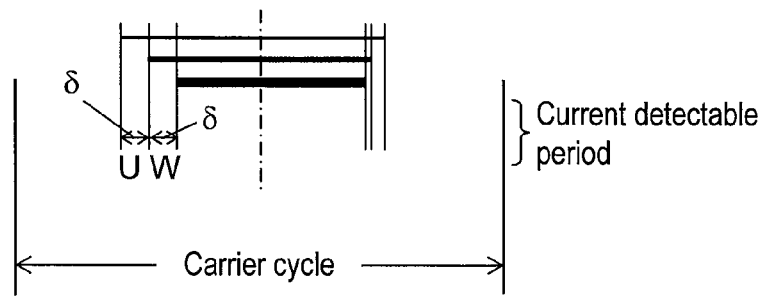
FIG. 36B shows the ON-period of each phase after correction for phase-current detection.
Figure 37:
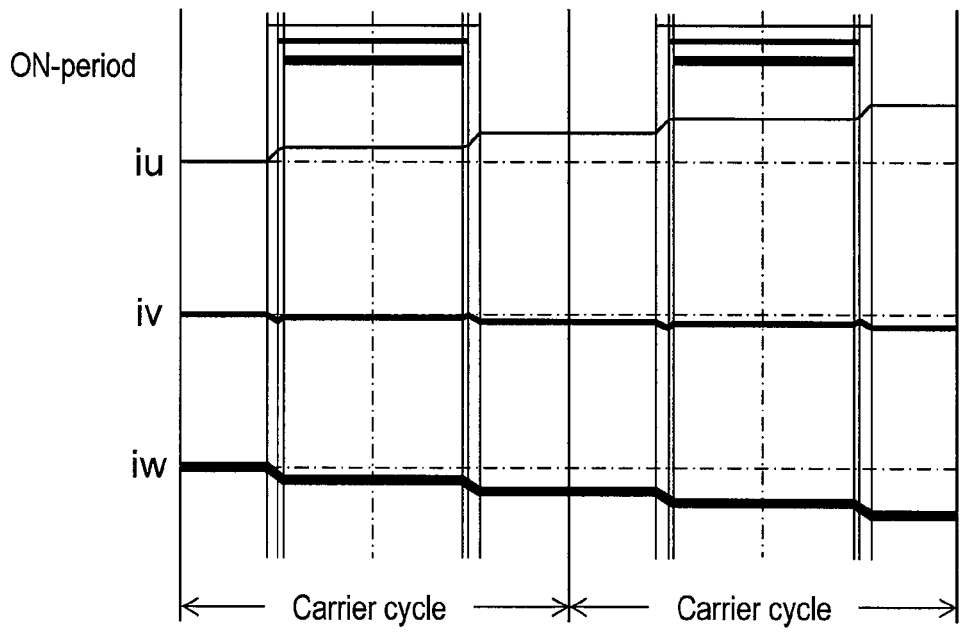
FIG. 37 shows changes in phase current of each phase with no correction for phase-current detection.
Figure 38:
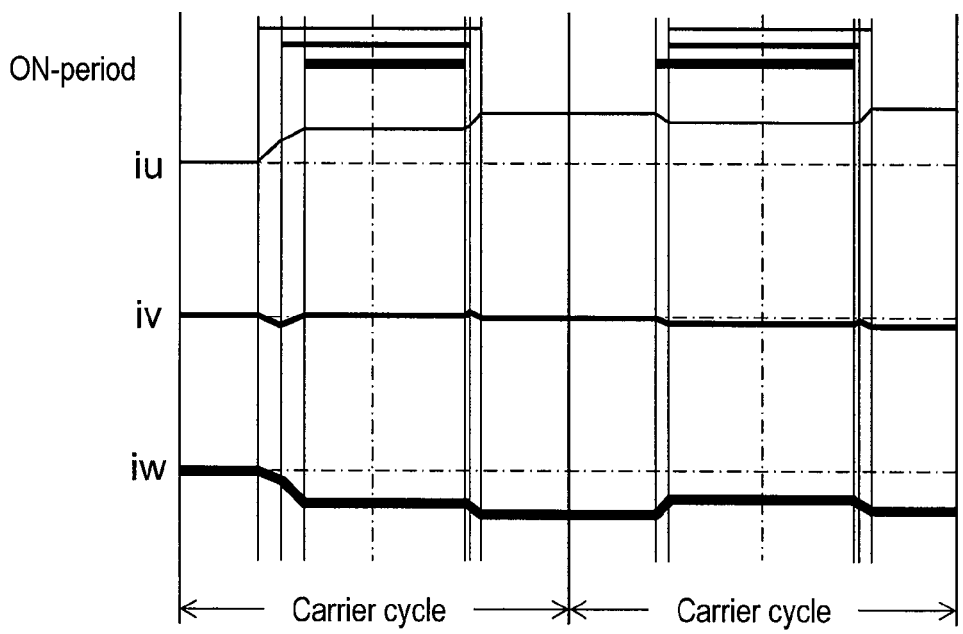
FIG. 38 shows changes in phase current of each phase after correction for phase-current detection.

In FIG. 33, inverter 20 is attached on the right side of electric compressor 40. Metal housing 32 accommodates compression mechanism 28, motor 11 and the like. Refrigerant is fed through inlet 33 and compressed by compression mechanism 28 (a scroll mechanism is employed here) driven by motor 11. The compressed refrigerant cools down motor 11 while passing through motor 11 and goes out of outlet 34.

Inverter 20 has case 30 for being easily attached with electric compressor 40. Inverter circuit 10 as a heat source is cooled down by low-pressure refrigerant via low-pressure pipe 38. Terminal 39, which is connected to the winding of motor 11 in the interior of electric compressor 40, is connected to the output section of inverter circuit 10. Connecting line 36, which is fixed to inverter 20 by holding section 35, contains a power-source line connected to battery 1 and a signal line connected to an air-conditioning controller (not shown) for sending an rpm signal.

Such an inverter-integrated electric compressor needs an inverter with a compact and vibration-proof structure. Considering this, inverter 20 of the present invention is suitable for the inverter-integrated electric compressor, in particular, preferably used for a vehicle-mounted air conditioning device.

In a case where the motor operates at a low speed (of around 600 rpm, 10 Hz) and therefore mechanical noise is relatively kept small, noise caused by ripple current tends to sound harsh. The structure of the present invention is particularly effective in the case above. However, mechanical noise greatly depends on the structure of an inverter-integrated electric compressor; a preferable effect can be expected on a motor operating at a speed of 1200 rpm (20 Hz).

Although the structure of the present invention employs a battery for DC power source, it is not limited thereto. For example, a DC power source, which is obtained by rectifying commercial AC power source, can be effectively used. Although a sensorless DC brushless motor is employed for motor 11 in the structure, it is not limited thereto. Motor 11 may be a reluctance motor, an induction motor or the like. Furthermore, the structure is applicable to a driving system other than sine-wave driving. The structure of the present invention is particularly effective in three-phase modulation where a current waveform exhibits a smooth curve rather than in two-phase modulation.

INDUSTRIAL APPLICABILITY

As described above, the structure of the present invention provides a compact, lightweight, and reliable inverter with reduced noise and vibration. Employing a single current sensor, the inverter offers phase-current detection, DC detection, and protection of switching elements and diodes. The structure is therefore quite suitable for various products in consumer use and industrial use. AC equipment other than a motor can be a load on the inverter.

The invention claimed is:

1. An inverter comprising:
   an inverter circuit having upper-arm switching elements connected on a positive side of a DC power source and lower-arm switching elements connected on a negative side of the DC power source;
   a current sensor for detecting current flowing between the DC power source and the inverter circuit; and
   a control circuit energizing the inverter circuit by a PWM system for the inverter circuit to supply an AC to a motor, and detecting a phase current with the current sensor through a correction of a time, during which an ON-signal is supplied to only one or only two of the upper-arm switching elements, into a predetermined time necessary for detecting the phase current by the current sensor within a carrier cycle;
   wherein, the control circuit judges a direction of current, which is a direction flowing into the motor or a direction flowing out of the motor, of a phase having an intermediate length of an ON-period in the carrier cycle and changes the predetermined time according to the direction.

2. The inverter of claim 1, wherein the direction of current is judged by a phase of current flowing to the motor.

3. The inverter of claim 1, wherein the direction of current is judged by a phase of applied voltage to the motor.

4. The inverter of claim 1, wherein the correction is carried out in a case where the PWM system operates with a modulation degree smaller than a predetermined modulation degree.

5. The inverter of claim 1, wherein the correction is carried out in a case where the motor operates at an rpm lower than a predetermined rpm.

6. The inverter of claim 1, wherein the PWM system is a three-phase modulation.

7. The inverter of claim 1, wherein the motor drives an electric mechanism section and forms an electric compressor.

8. The inverter of claim 7, wherein the inverter is mounted on the electric compressor.

9. The inverter of claim 8, wherein the electrical compressor is formed as a vehicle-mounted structure.

* * * * *